United States Patent [19]

Miyazaki et al.

[11] Patent Number: 4,651,299
[45] Date of Patent: Mar. 17, 1987

[54] DATA PROCESSING APPARATUS

[75] Inventors: Yasuko Miyazaki; Mikiharu Matsuoka, both of Tokyo; Sakae Horyu, Hachiohji; Takashi Kanemoto; Hirohiko Katayama, both of Kawasaki, all of Japan

[73] Assignee: Canon Kabushiki Kaisha, Tokyo, Japan

[21] Appl. No.: 601,487

[22] Filed: Apr. 18, 1984

[30] Foreign Application Priority Data

| Apr. 27, 1983 | [JP] | Japan | 58-74560 |
| May 20, 1983 | [JP] | Japan | 58-88926 |
| May 20, 1983 | [JP] | Japan | 58-88927 |
| Aug. 31, 1983 | [JP] | Japan | 58-158046 |

[51] Int. Cl.⁴ .................... G06F 3/14; G09G 3/02
[52] U.S. Cl. .................... 364/900; 340/706; 340/709; 340/717

[58] Field of Search ............... 364/200 MS File, 518, 364/519, 520, 521; 340/706, 709, 717, 286 M, 524, 525

[56] References Cited

U.S. PATENT DOCUMENTS

| 3,166,636 | 1/1965 | Rutland et al. | 340/717 X |
| 3,728,710 | 4/1973 | Berg | 340/709 |
| 4,428,065 | 1/1984 | Duvall et al. | 364/900 |

Primary Examiner—Raulfe B. Zache
Attorney, Agent, or Firm—Fitzpatrick, Cella, Harper & Scinto

[57] ABSTRACT

A data processing apparatus for training hearing and/or speech impaired children or for teaching different subjects has a main control section, keyboards for inputting data, a ROM for storing a control program, and a RAM for storing the input data, a CRT display for displaying the input data, and a printer for printing out the data. The apparatus allow simultaneous data input by an instructor and students and can print out the input data in accordance with the sequence it is inputted.

11 Claims, 30 Drawing Figures

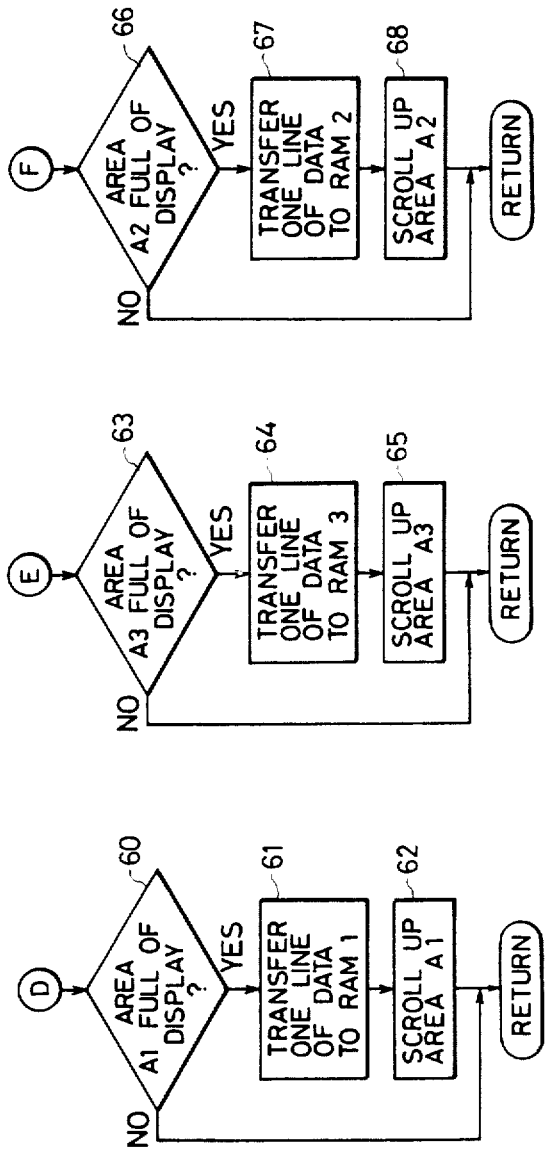

FIG. 4

```
2 + 3  =  ?        5              5
2 × 3  =  ?        6              7 CORRECT ANSWER
                                    IS 6
```

FIG. 9B

| NOMINATION OF SPECIAL KEY | PROCESS |
|---|---|
| KEY A | SHIFT CURSOR RIGHTWARD BY ONE CHARACTER |
| KEY B | SHIFT CURSOR LEFTWARD BY ONE CHARACTER |
| KEY U | SHIFT CURSOR UPWARD BY ONE LINE |
| KEY D | SHIFT CURSOR DOWNWARD BY ONE LINE |
| DELETE KEY | DELETE "A" CHARACTER ON CURSOR POSITION (SENTENCE AFTER DELETE POSITION IS SHIFTED BY THE DELETED CHARACTERS.) |
| PRINT KEY | PRINT OUT DATA IN RAM 1 (13-1) BY PRINTER 6 |

DATA PROCESSING APPARATUS

BACKGROUND OF THE INVENTION

1. Field of the Invention

The present invention relates to a data processing apparatus and, more particularly, to a data processing apparatus for educational purposes which outputs data inputted through a plurality of key input means and can converse with an operator in accordance with the output data.

2. Description of the Prior Art

Conventionally, a hearing and speech impaired child is trained by a trained instructor using a man-to-man method in order to improve the child's ability to converse with another person. When such training is compared with conversation training for non-handicapped children, the load on the trained instructor is very large In view of this, there is a great demand for equipment which can simultaneously train a number of handicapped children to overcome their disability.

SUMMARY OF THE INVENTION

It is an object of the present invention to provide a data processing apparatus which responds to such demands and which displays on a display an input by an operator (handicapped person) through a keyboard, so that the apparatus can be used as a conversation training machine which can simultaneously train a number of handicapped persons.

It is another object of the present invention to provide a data processing apparatus which can simultaneously display on a single screen data inputted through a plurality of keyboards.

It is still another object of the present invention to provide a data processing apparatus which can display data inputted through a plurality of keyboards on predetermined areas of a screen which are assigned to the respective keyboards.

Another object of the present invention is to provide a data processing apparatus which can control, by means of one keyboard among a plurality of keyboards, data input through remaining keyboards.

Yet another object of the present invention is to provide a data processing apparatus which has a display for each of a plurality of keyboards for confirmation of data inputted through the corresponding keyboard.

It is still another object of the present invention to provide a data processing apparatus which displays the remaining memory capacity of a memory incorporated therein.

Another object of the present invention to provide a data processing apparatus which sets a function of a specific key in accordance with the position of a cursor.

In accordance with one aspect of the invention, there is provided a data processing apparatus comprising a plurality of input means, display means for displaying data inputted from the plurality of input means wherein the display means has a cursor assigned to each of the predetermined areas for the plurality of input means and the display means has partitioning lines for partitioning the predetermined areas of the display means respectively assigned to the plurality of input means, and control means for controlling the display of the data inputted through each of the plurality of input means in its respective predetermined area of the display means.

In accordance with another aspect of the invention, there is provided a data processing apparatus comprising a plurality of input means, display means for displaying data inputted from the plurality of input means, designating means, arranged at at least one of the plurality of input means, for designating output of data inputted from another of the plurality of input means to the display means, and control means for controlling the output of the data inputted from another of the plurality of input means to the display means in accordance with an instruction from the designating means.

In accordance with another aspect of the invention, there is provided a data processing apparatus comprising input means for inputting data, memory means for storing the data inputted by the input means, display means for displaying the data inputted by the input means, and output means for detecting an available capacity of the memory means and for outputting to the display means the available capacity of the memory means which changes with the input of the data by the input means after the available capacity reaches a predetermined value.

In accordance with another aspect of the invention, there is provided a data processing apparatus comprising a plurality of input means, first display means connected to the input means for displaying at an area assigned to each of the plurality of input means the data input from each of the plurality of input means, and second display means connected to the first display means for printing out and confirming the data which has been input from each of the plurality of input means and displayed by the display means.

In accordance with another aspect of the invention, there is provided a data processing apparatus comprising a plurality of input means, display means, consisting of a plurality of display areas respectively corresponding to said plurality of input means, for displaying data inputted through each of the plurality of input means at the corresponding display area thereof, wherein the display means has partition lines for partitioning the predetermined areas of the display means respectively assigned to the plurality of input means, a cursor arranged for each of the display areas of the display means for designating a display position of the data inputted from each of the plurality of input means, and control means for shifting cursors arranged for the display areas of the display means every time the data is inputted from the plurality of input means, respectively.

In accordance with another aspect of the invention, there is provided a data processing apparatus comprising a plurality of input means, display means for displying data inputted from the plurality of the input means, a cursor for displaying a display position at the display means for the data inputted from each of the plurality of input means, a key, arranged at at least one of the plurality of input means, having a first mode for allowing input from a desired one of the plurality of input means, and a second mode for shifting the cursor to a predetermined position, and means for detecting the position of the cursor on the display means and for setting the key in the first or second mode.

In accordance with another aspect of the invention, there is provided a data processing apparatus comprising a plurality of input means for inputting character data and punctuation data for indicating punctuations of the character data, memory means having a plurality of memory areas for storing the data inputted from the plurality of input means at the different memory areas thereof, and recording means for recording the data stored in each of the memory areas in correspondence therewith, said recording means sequentially accessing said plurality of memory areas for reading out the data therefrom and printing out the data if the readout data is character data and for processing the data as one-line space data if the readout data is the punctuation data.

The above objects and features of the present invention will become apparent from the following detailed description of the preferred embodiments thereof taken in conjunction with the accompanying drawings.

BRIEF DESCRIPTION OF THE DRAWINGS

FIGS. 1A, 1B, 2, 3A-1, 3A-2, 3B, 3C, 3D, 3E-1, 3E-2 and are views showing a first embodiment of the present invention, in which FIG. 1A shows the configuration of a data processing apparatus according to the first embodiment, FIG. 1B is a front view of a display screen of a dipslay section, FIG. 2 is a block diagram of this embodiment, FIGS. 3A-1, 3A-2, 3B, 3C, 3D, 3E-1 and 3E-2 show the control flow chart of this embodiment, and FIG. 4 is a representation showing an example of the printing output of a printer;

FIGS. 5, 6, 7, 8, 9A-1,9A-2 and 9B are views showing a second embodiment of the present invention, in which FIG. 5 shows the configuration of a data processing apparatus according to the second embodiment, FIG. 6 is a representation showing an example of a display, FIG. 7 is a plan view of a keyboard, FIG. 8 is a block diagram of this embodiment, and FIGS. 9A-1, 9A-2 and 9B show the control flow chart of this embodiment;

FIGS. 10 to 13 are views showing a third embodiment of the present invention, in which FIG. 10 shows the configuration of a data processing apparatus of this embodiment, FIG. 11 is a view showing a display screen of a CRT display used in this embodiment, FIG. 12 is a block diagram of this embodiment, and FIG. 13 shows the control flow chart of this embodiment; and FIGS. 15, 16, 17, 18A, 18B, 18C and 19 shows a fourth embodiment of the present invention, in which FIG. 15 is a block diagram of this embodiment, FIG. 16 is a representation showing an example of a printed output obtained in this embodiment, FIGS. 17 and 18A, 18B and 18C show the flow chart for explaining the mode of operation of this embodiment, and FIG. 19 shows the format of a RAM of this embodiment.

DETAILED DESCRIPTION OF THE PREFERRED EMBODIMENTS

The preferred embodiments of the present invention will now be described in detail with reference to the accompanying drawings.

First Embodiment

Figure 1A:
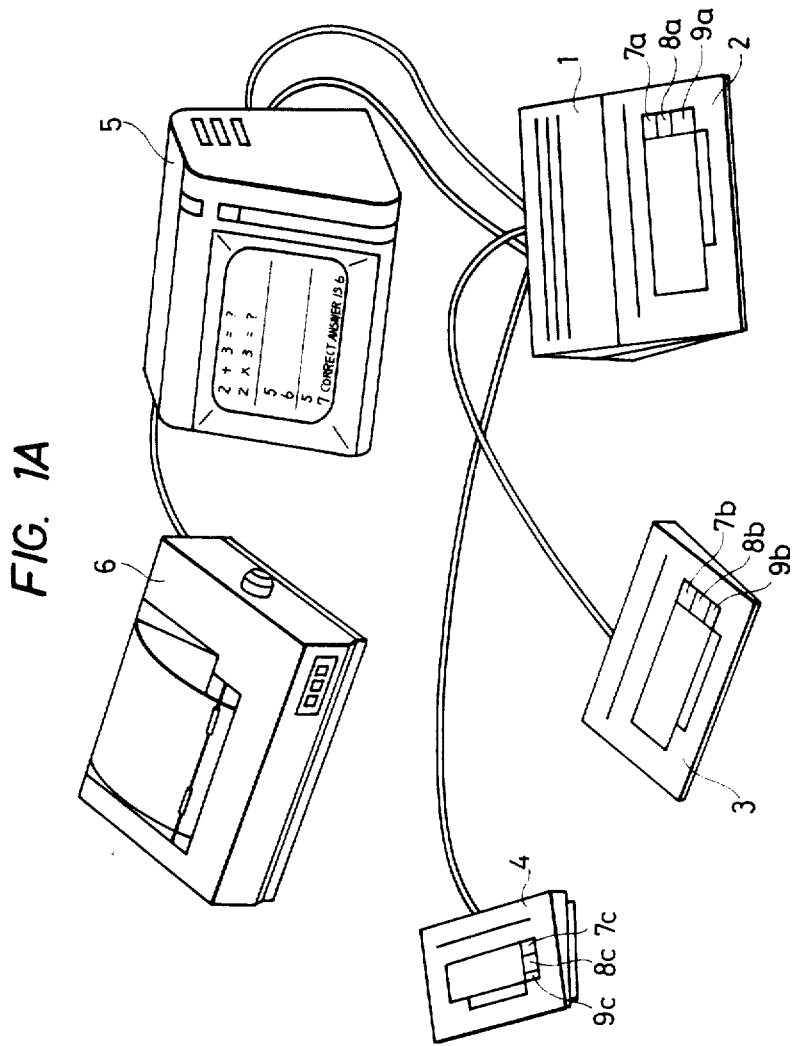

FIG. 1A is a schematic perspective view of a data processing apparatus according to the first embodiment.

Figures 1, 3A:
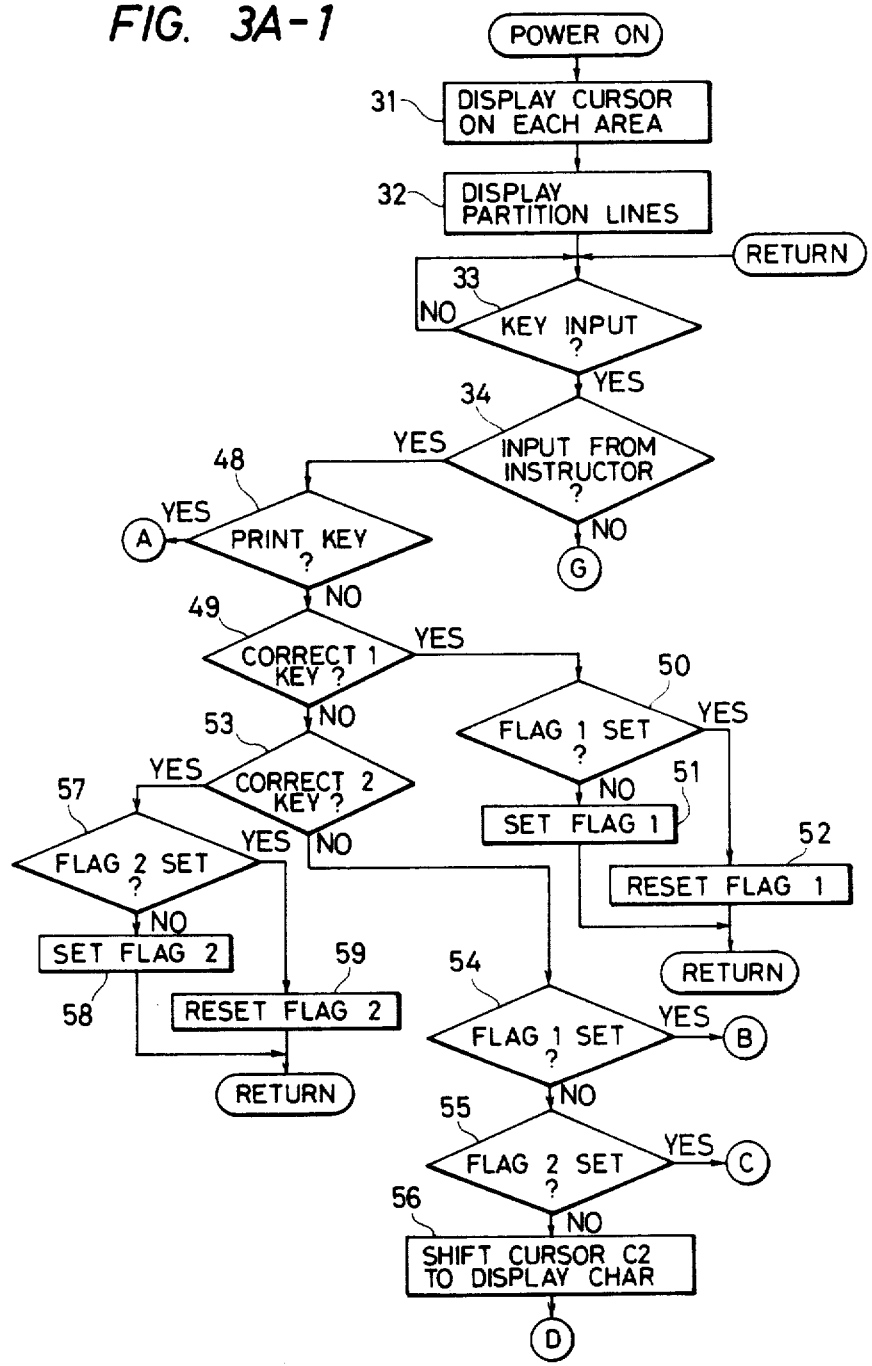
Figures 2, 3A:
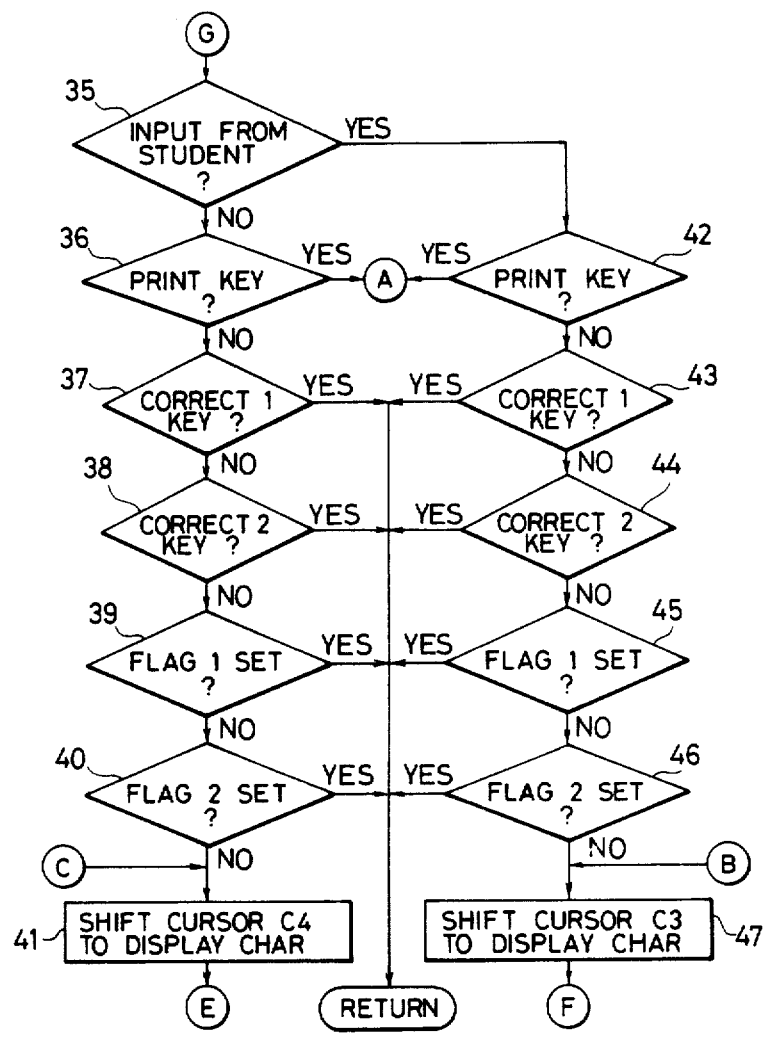
Figures 1, 3E:
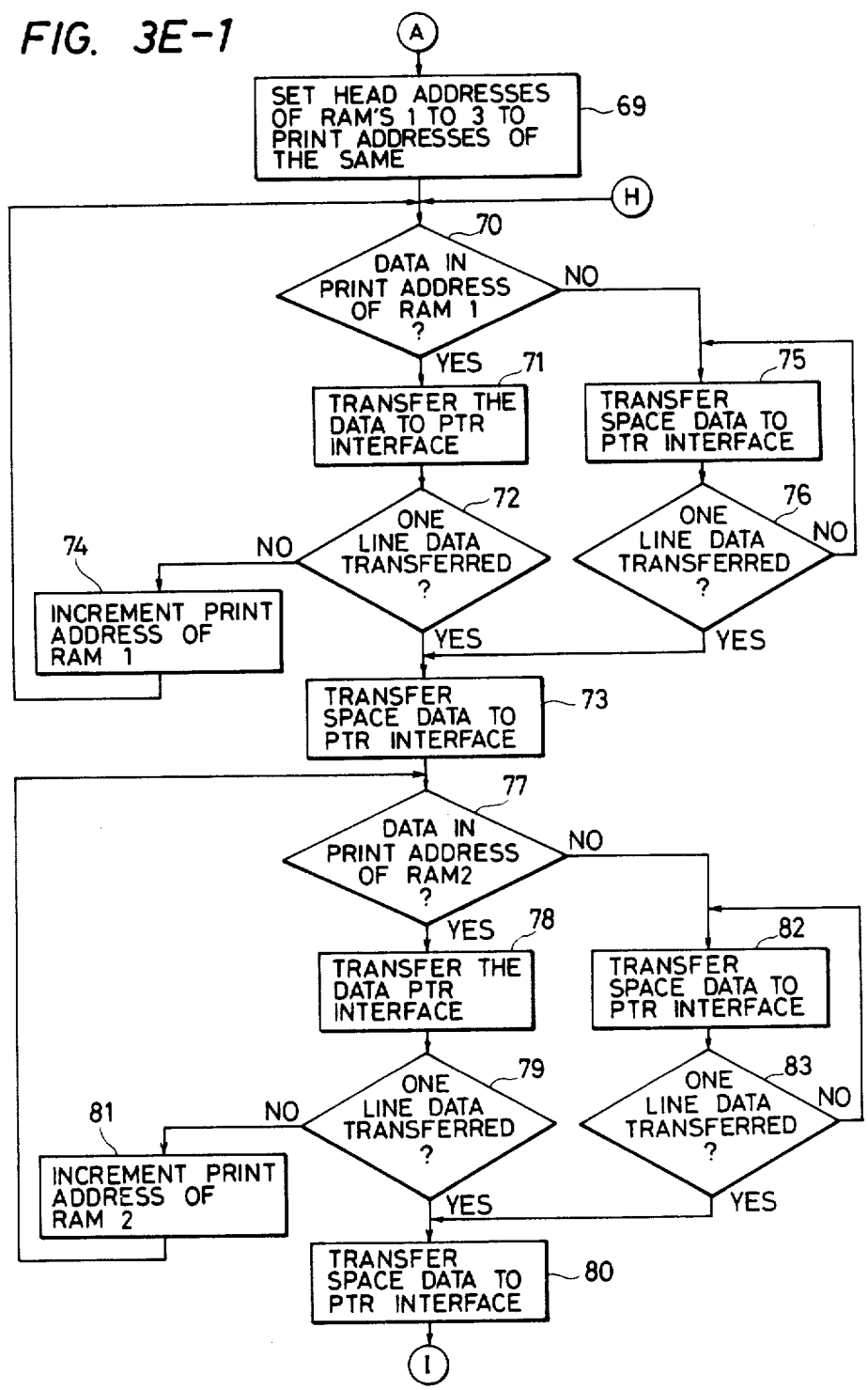
Figures 2, 3E:
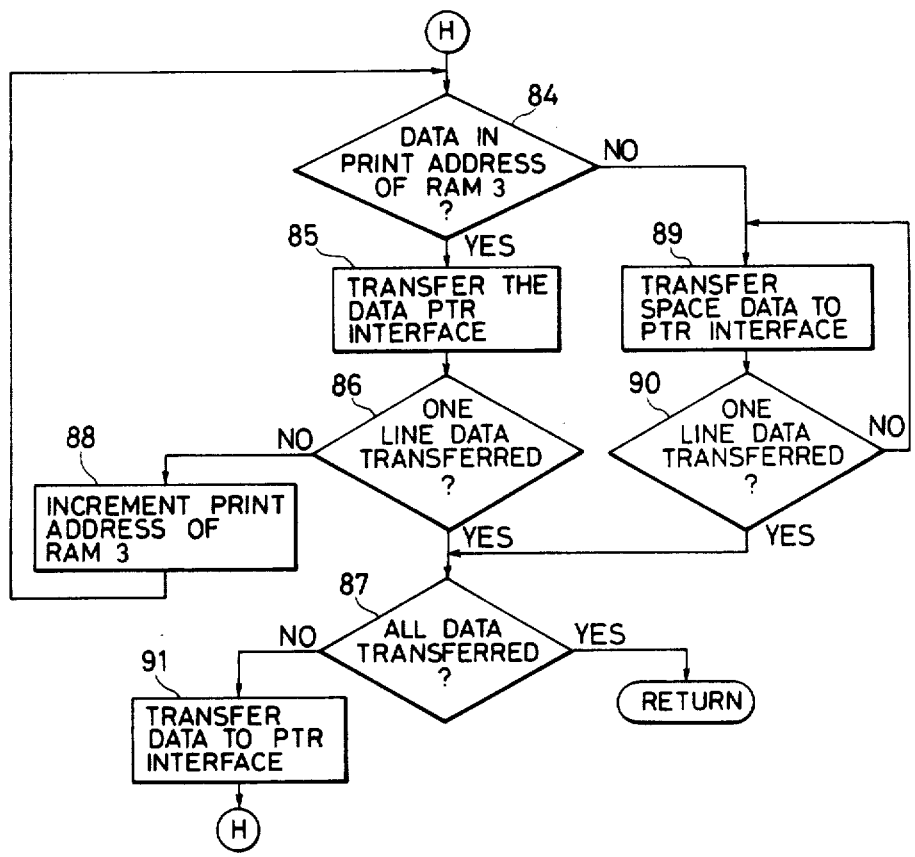

Referring to FIG. 1, a controls section 1 controls various devices connected thereto. Keyboards 2, 3 and 4 are coupled to the control section 1. Of these keyboards 2, 3 and 4, keyboard 2 is an instructor keyboard which has the higher priority over the other keyboards. A printer 6 is connected to a CRT display 5. Data, such as a sentence, input through the keyboard, is displayed on the CRT display 5 of a data display section. Sentences inputted through a plurality of keyboards are displayed on the CRT display 5 so as to allow conversation between the instructor and students so that hearing and/or speech impaired children can be trained. In addition to general character input keys, each keyboard has correct 1 key 7, a correct 2 key 8, and a print key 9 as control keys. The operations of these keys will be described later.

Figure 1B:
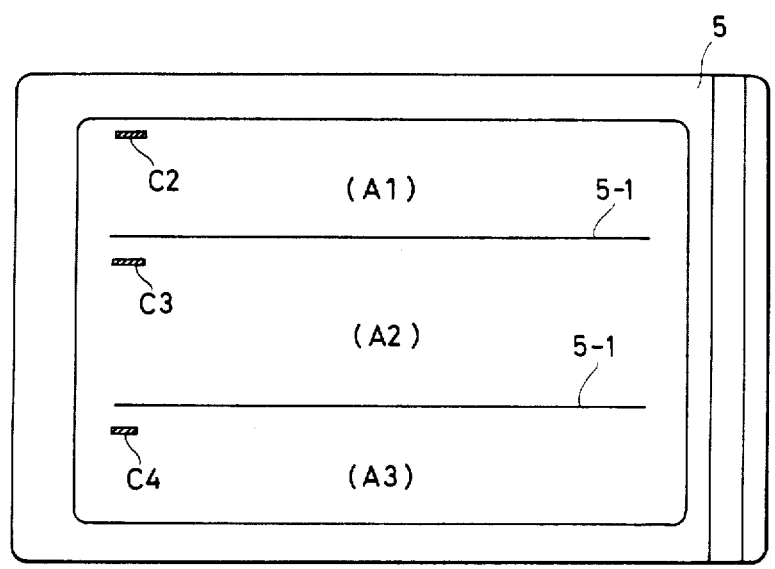

FIG. 1B is a front view of the display screen of the CRT display 5. As shown in FIG. 1B, a cursor C2 and an area A1 are assigned to the keyboard 2, a cursor C3 and an area A2 are assigned to the keyboard 3, and a cursor C4 and an area A3 are assigned to the keyboard 4. A partition line 5-1 partions each pair of adjacent areas. The respective cursors indicate the insertion positions of the data to be inputted next.

Figure 2:
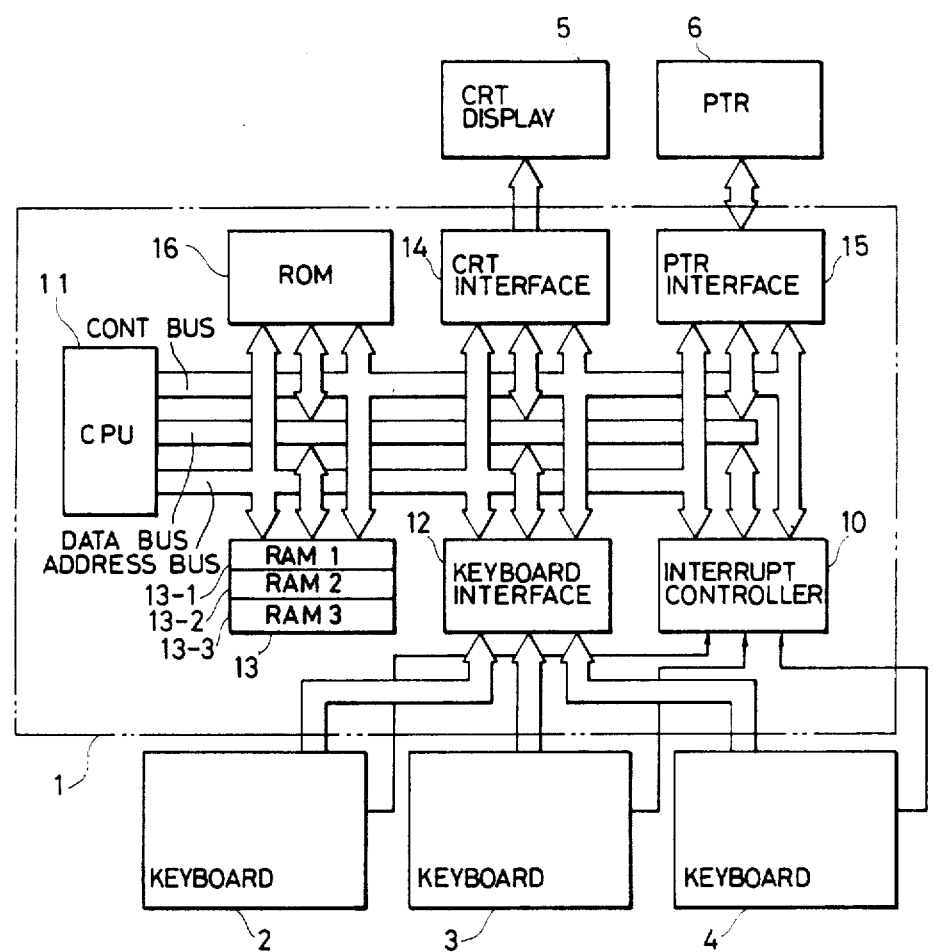

FIG. 2 shows a schematic block diagram of the first embodiment. In this embodiment, three keyboards are connected to the control section 1. However, four or more keyboards can be connected to the control section 1.

Figure 4:
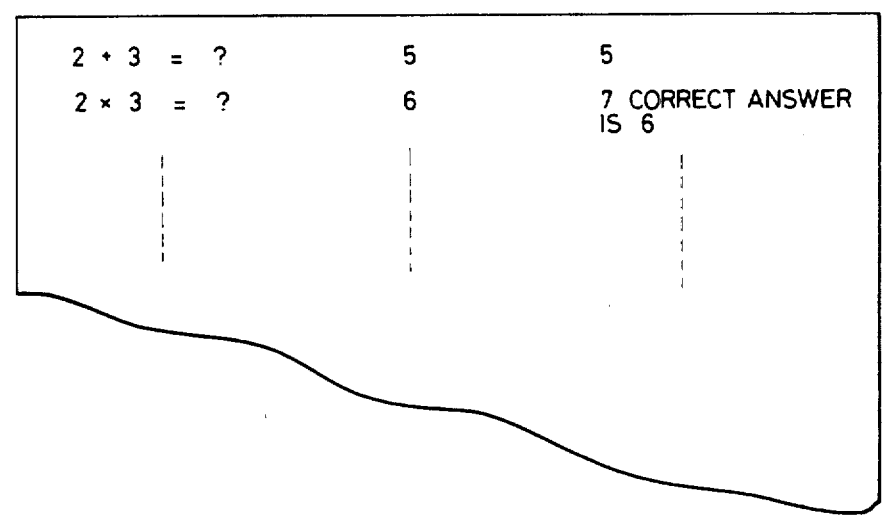

A CPU 11 controls the overall apparatus. In response to an instruction from the CPU 11, a keyboard interface 12 performs control operations such as fetching an input signal through the keyboard A random-access memory 13 is divided into a RAM1 (13-1), RAM2 (13-2) and RAM3 (13-3). The memory 13 stores overflow data among the data inputted through the keyboards and displayed on the CRT display 5. When an overflow occurs on an area of the CRT display 5, the input data from the keyboard 2 is transferred in the RAM1 (13-1) in units of lines, the data from the keyboard 3 is transferred in the RAM2 (13-2) in units of lines, and the data from the keyboard 4 is transferred in the RAM3 (13-3) in units of lines. When the print key 9 is depressed, the data stored in the RAM1 (13-1), RAM2 (13-2) or RAM3 (13-3) is transferred to a printer interface 15 through the CPU 11 and is sent to the printer 6. The data is then printed out by the printer 6 for each area (keyboard). FIG. 4 shows the output format of the printer 6. A CRT interface 14 causes the CRT display 5 to display the sentences inputted through the keyboards 2 to 4. The CRT interface 14 comprises a character generator, a video RAM, a video signal generator, and the like.

The printer interface 15 is an interface between the CPU 11 and the printer 6 for printing out the sentence displayed on the CRT display 5 or the sentence stored in the memory 13. An interrupt controller 10 performs an interrupt of the CPU 11 mainly based on a key strobe signal which is generated when a key of one of the keyboards 2 to 4 is depressed. A ROM (read-only memory) 16 stores a control program of the CPU 11.

The instructor and students perform a conversation with the apparatus having the above configuration.

The conversation training method between the instructor and students will be described below.

When the instructor inputs "2 plus 3 equals what?" through the keyboard 2, the input sentence is displayed in the area A1 for the keyboard 2. Then, the students input "Correct answer is 5" through the keyboards 3 and 4, and the answers are displayed in the areas A2 and A3.

In the apparatus of the present invention, the instructor and students can simultaneously input data through the corresponding keyboards. Therefore, a conversation can be performed in the manner as between non-handicapped persons, thereby providing good training for conversational ability The mode of operation of this embodiment will now be described in detail with reference to the control flow chart shown in FIGS. 3A to 3E.

When the power of the apparatus is turned on, the cursors C2, C3 and C4 are displayed at the initial positions of the areas A1, A2 and A3 of the CRT display 5, in step 31. In step 32, the partitioning lines 5-1 of the areas are displayed. FIG. 1B shows the screen in this state. The flow then advances to step 33 wherein a key input through the keyboards 2 to 4 is checked When a key of one of the keyboards 2 to 4 is determined to be depressed in step 33, the corresponding keyboard produces a key data (key code data) signal and a strobe signal. The key data signal is supplied to the keyboard interface 12, while the strobe signal is supplied to the interrupt controller 10. In response to the strobe signal, the interrupt controller 10 supplies an interrupt request to the CPU 11. Upon reception of the interrupt request, the CPU 11 fetches the key data signal from the keyboard interface 12 and executes the flow after step 34 in accordance with the fetched key data signal.

In step 34, it is discriminated if the key input is a key input from the keyboard 2 of the instructor. If step 34 is YES, the flow advances to step 48. If step 34 is NO, the flow advances to step 35 wherein it is determined if the key input is a key input from the keyboard 3 (student 1). If step 35 is YES, the flow advances to step 42. Step 42 is checked to determine if the key input is a print key input. If step 42 is YES, the flow advances to step 69 in FIG. 3E so as to perform a printing operation by the printer 6. If step 42 is NO, it is determined ked in steps 43 and 44 if the key input is an input of a correct 1 key 7b or an input of a correct 2 key 8b. If either step 43 or 44 is YES, the flow returns to step 33. Then, step 45 or 46 is checked to determine if flag 1 or 2, to be described below, is set. If either step 45 or 46 is YES, the flow returns to step 33.

If either step 45 or 46 is NO, the flow advances to step 47 wherein the input characters are displayed at the cursor position of the area A2 and the cursor is shifted. The display data is transferred to the video RAM in the CRT interface 14. The data stored in the video RAM is constantly scanned. The transferred data is converted into a dot pattern by the character generator and into a video signal to be displayed on the CRT display 5. Character data in the video RAM corresponds to the display on the CRT display 5. Therefore, when the character data in the video RAM is changed, the characters displayed on the CRT display 5 also change. A cursor register is incorporated for each of the cursors C2, C3 and C4. When the value in each of the cursor registers coincides with the character data read address of the video RAM, the cursor display output is produced and is displayed on the screen. Therefore, the value of the cursor register must be incremented or decremented in order to move the cursor.

Then, the flow advances to step 66 in FIG. 3D wherein it is checked if the area A2 is full of display. If step 66 is NO, the flow returns to step 33 and the next key input is awaited. However, if step 66 is YES, in order to perform a scroll up of one line, the data in the video RAM for the uppermost line of the area A2 is transferred to the RAM2 (13-2), in step 67. Thereafter, in step 68, the data of the area A2 in the video RAM is scrolled up and the flow returns to step 33.

When it is determined in step 35 that the key input is from a student, e.g., from the keyboard 4, the flow advances to step 36, and the processing from steps 42 to 68 is performed. Thus, a write operation on the input characters in the memory area in the video RAM in the CRT interface 14, shifting of the cursor, and, if necessary, scroll-up of the data are performed.

If it is determined in step 34 that the key input is from the keyboard 2 of the instructor, the flow advances to step 48. If it is determined in step 48 that the key input is from a print key 9a, the flow goes to step 69 in FIG. 3E. If step 48 is NO, it is then determined in step 49 if the key input is a key input of a correct 1 key 7a.

The functions of the correct 1 key 7a and the correct 2 key 8a will now be described. When the instructor inputs the sentence "2 multiplied by 3 equals what?" through the keyboard 2, the input sentence is displayed in the area A1 of the screen.

When the students input their answers through their keyboards 3 and 4, the answers are displayed in the areas A2 and A3 of the screen. When the student using the keyboard 4 inputs an incorrect answer such as "Correct answer is 7", the instructor can display the data from the keyboard 2 at the display area corresponding to the student using the keyboard 4. When the correct 2 key 8a is depressed the first time, the subsequent key input data is displayed in the area A3. Upon depression of the correct 2 key 8a a second time, this input mode is cancelled.

Thus, the instructor inputs through the keyboard 2 "Correct answer is 6", and then the "Correct answer is 6" is displayed on the screen area for the student 2. Thus, the student can learn from the instructor. Afterwards, when the instructor depresses the correct 2 key 8a the second time, the normal operation mode is restored. When the correct 1 key 7a is depressed the first time, subsequent key input is displayed in the area A2. When the correct 1 key 7a is depressed the second time, the original operation mode is restored. During this learning mode, the student can only input a print instruction through the print key. When it is determined in step 49 that the correct 1 key 7a is depressed and if it is determined in step 50 that the flag 1 is set, the flag 1 is reset in step 52. However, if it is determined in step 50 that the flag 1 is not set, the flag 1 is set in step 51. The flow then returns to step 33. The flag 1 is for displaying the input data through the keyboard 2 in the area A2 of the screen. If it is determined in step 49 that the key input is not a key input through the correct 1 key 7a, it is checked in step 53 if the key input is a key input through the correct 2 key 8a. If step 53 is YES, control of the flag 2 is performed (steps 57 to 59) as in the case of the key input through the correct 1 key 7a. The flag 2 is for displaying the input data through the keyboard 2 in the area A2 of the screen.

However, if step 53 is NO, the key input is determined to be a general character input. Then, if it is determined in step 54 that the flag 1 is set, the flow goes to step 47 so as to process the input data as an input to be displayed in the area A2 corresponding to the keyboard 3.

When it is determined in step 55 that the flag 2 is set, the flow advances to step 41 so as to process the key input as an input to be displayed on the area A3 corresponding to the keyboard 4.

If neither of the flags 1 no or 2 is set, the key input is determined to be an input for its own area, that is, the area A1. Thus, the flow after step 56 is performed including the display of the input characters in the area A1, shifting of the cursor, and a scroll up, if required.

An input through one of print keys 9a, 9b and 9c will now be described. When a print key input is entered through each keyboard, the flow advances to step 69 in FIG. 3E and the printing processing is performed thereafter.

In step 69, the head addresses of the RAM1 (13-1), the RAM2 (13-2) and the RAM3 (13-3) are set as the respective print addresses. In step 70, it is determined if printing data is stored in the RAM1 (13-1) for the keyboard 2. If step 70 is YES, the data corresponding to the print address of the RAM1 (13-1) is transferred to the printer interface 15, in step 71. In steps 72 and 74, the print addresses are sequentially incremented until the printing data in the RAM1 (13-1), which corresponds to one printing line of the printer 6, is transferred to the printer interface 15.

When there is no more printing data at the print address, space data is transferred to the priner interface 15 until the data corresponds to one line, in steps 75 and 76. When the printing data of one line has thus been transferred, the space data for one character is transferred to the printer interface 15 in step 73, and the transfer of the printing data of one line in the RAM1 (13-1) is completed.

The flow then advances to step 77 wherein the printing data in the RAM2 (13-2) is transferred to the printer interface 15 in the same manner as in steps 70 to 73. Subsequently, the printing data in the RAM3 (13-3) is transferred to the printer interface 15 in a similar manner as step 84 and subsequent steps. From steps 70 to 86, it is determined if the printing data corresponding to one printed line of the printer 6 is transferred from the RAM1 (13-1), RAM2 (13-2) and RAM3 (13-3). It is checked in step 87 to determine if there is any printing data remaining in the memory 13. If there is some data remaining in the memory 13, carriage return data is transferred to the printer interface 15 in step 91, and the flow returns to step 70. Thus, the printing data corresponding to one printed line of the printer 6 is transferred to the printer interface 15. If it is determined in step 87 that there is no more data remaining in the memory 13, transfer of all the data has been completed. Thus, the flow returns to step 33.

The above embodiment was described with reference to a conversation between one instructor and two students. However, the instructor can converse with three or more students if a corresponding number of keyboards are used.

Furthermore, the above description is made with reference to training hearing and/or speech impaired children. However, when the character patterns in the character generator are changed to those of different languages, the apparatus of the above embodiment can be used as equipment for learning foreign languages.

As has been described in detail above, according to the present invention, the instructor can simultaneously train a number of handicapped persons, so that the conversational ability of these persons can be improved effectively and efficiently.

The conversation among the three persons can be printed out by a printer, so that the conversation can be recorded effectively.

Second Embodiment

Figure 5:
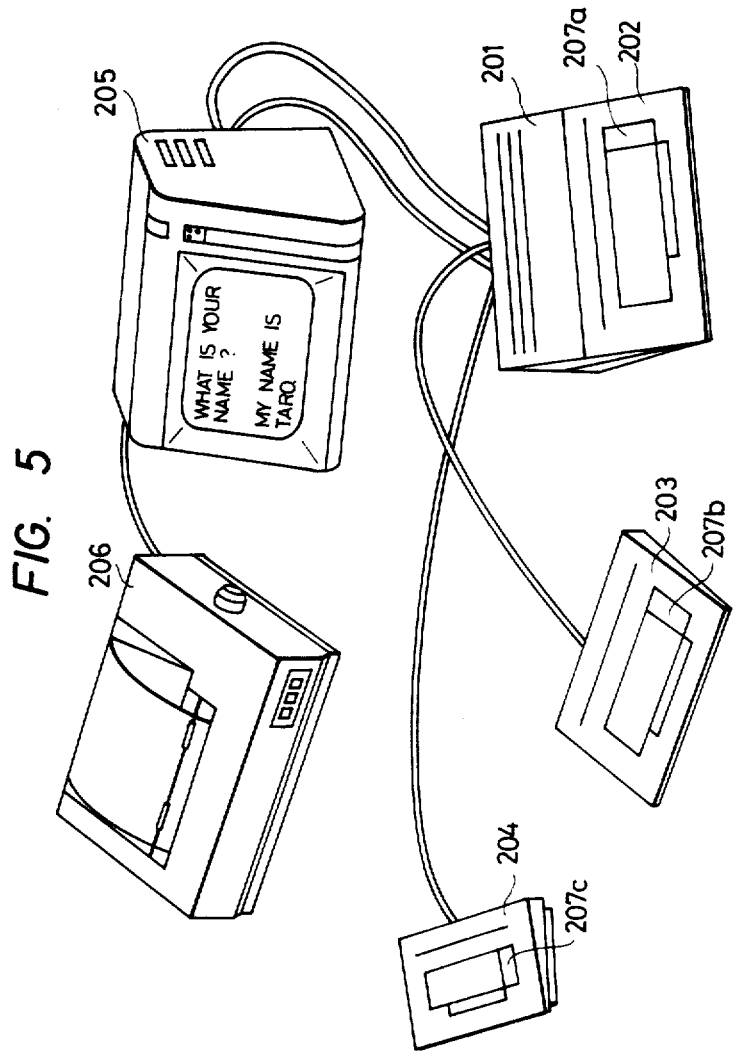

FIG. 5 is a schematic perspective view of a data processing apparatus according to a second embodiment of the present invention.

Referring to FIG. 5, a control section 201 controls various devices connected thereto. Of keyboards 202, 203 and 204, the keyboard 202 is formed integrally with the control section 201 and serves as the instructor's keyboard. A printer 206 is connected to a CRT display 205. Data, for example, a sentence input froma keyboard, can be displayed on the CRT display 205 of a data display section. Sentences input through a plurality of keyboards are displayed on the CRT display so as to allow a conversation. Therefore, hearing and/or speech impaired persons can converse with each other.

Figure 7:
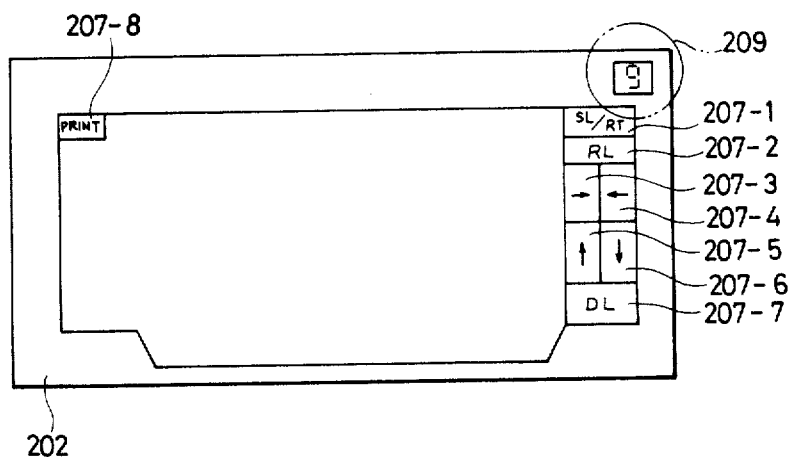

Each keyboard has a control key section 207 in addition to general character input keys. FIG. 7 shows a plan view of the keyboard so as to show details of the control key section 207.

The control key section 207 includes a select/return key (to be hereinafter referred to as an S/R key) 207-1, a recall key 207-2, a key (to be hereinafter referred to as an A key) 207-3 for shifting the cursor to the right by one character space, a key 207-4 (to be hereinafter referred to as a B key) for shifting the cursor to the left by one character space, a key (to be hereinafter referred to as a U key) 207-5 for shifting the cursor upward by one line, a key (to be hereinafter referred to as a D key) 207-6 for moving the cursor downward by one line, and a key (to be hereinafter referred to as a delete key) 207-7 for deleting the character on the cursor and to shift the subsequent sentence to the left by one character space. A print key 207-8 is for printing out data input through and stored in each keyboard by a printer 206.

Figure 8:
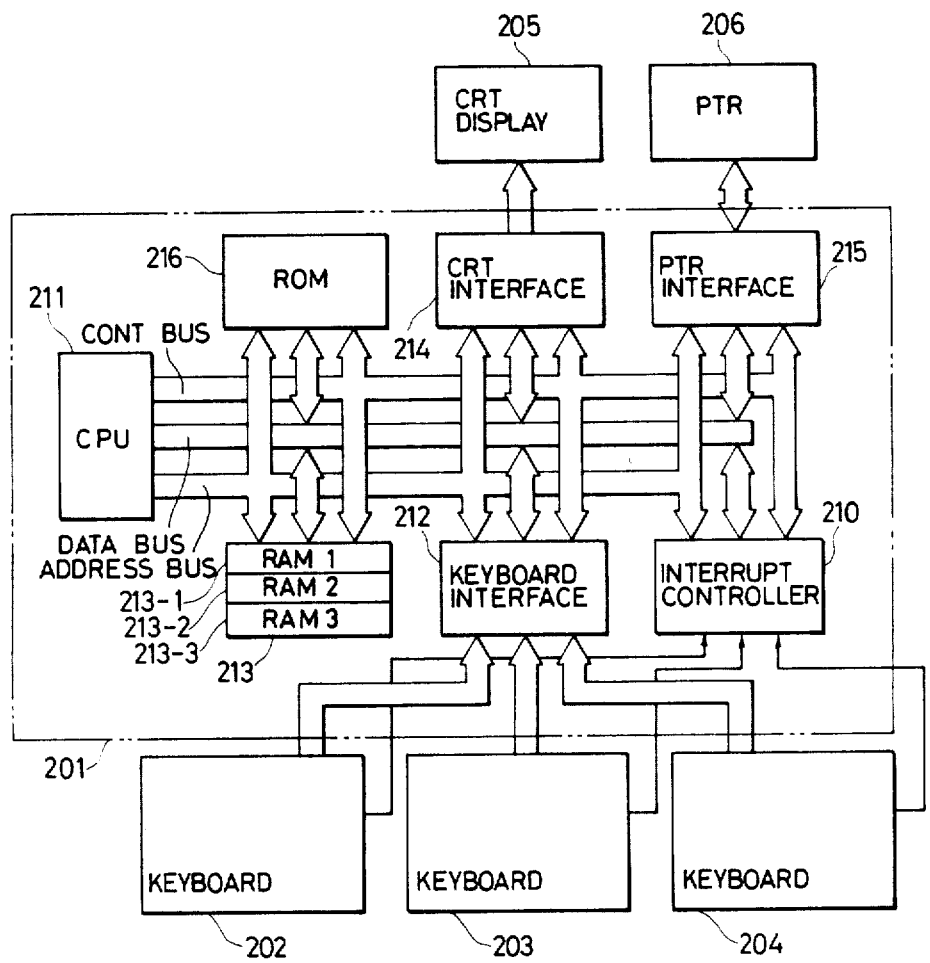

FIG. 8 shows a schematic block diagram of this embodiment. In this embodiment, three keyboards are connected to the control section 201. However, four or more keyboards can be connected.

A CPU 211 comprises a microprocessor for controlling the overall apparatus. In response to an instruction from the CPU 211, a keyboard interface 212 controls operations for the keyboards 202, 203 and 204, such as fetching the input signal therethrough. A random-access memory 213 comprises a RAM1 (213-1), a RAM2 (213-2) and a RAM3 (213-3). The RAM1 (213-1) stores overflow data among the data input through the keyboards and displayed on the screen of the CRT display 205. The RAM2 (213-2) stores the overflow data from only the keyboard 202 as in the case of the RAM1 (213-1). The RAM3 (213-3) stores the data currently displayed on the CRT display 205 when the recall key 207-2 of the keyboard 203 or 204 is depressed. A CRT interface 214 is for displaying the sentence data inputted through the keyboards 202 to 204 at the CRT display 205. The CRT interface 214 comprises a character generator, a video RAM, a video signal generator, and the like.

A printer interface 215 is an interface between the CPU 211 and the printer 206 for printing out the sentence displayed on the CRT display 205 or the sentence stored in the memory 213. An interrupt controller 210 performs an interrupt of the CPU 211 based on a key strobe signal generated upon depression of a key on one of the keyboards 202 to 204. A ROM (read-only memory) 216 stores a control program for the CPU 211.

An example of a conversation between the instructor and students using the apparatus of the above configuration will now be described. The instructor inputs from his keyboard 202 a sentence "What is your name?". Then, the instructor depresses the S/R key 207-1 on the keyboard 202. Then, by the select function of the S/R key 207-1, the keyboard 203 of the student keyboards 203 and 204 is selected, so that an input can be entered througn only the keyboard 203. Then, the student of the keyboard 203 inputs his answer "My name is Taro." by means of the character input keys of his keyboard 203.

Then, this input sentence is displayed at a position below the question of the instructor on the CRT display 205.

When the instructor wants the answer from another student, he depresses the S/R key 207-1 on the keyboard 202 to designate another student. Then, the input through the designated keyboard 204 alone is enabled. The student of the keyboard 4 can then input his answer.

In this manner, the instructor can individually train his students through the keyboard 202.

Figures 1, 9A:
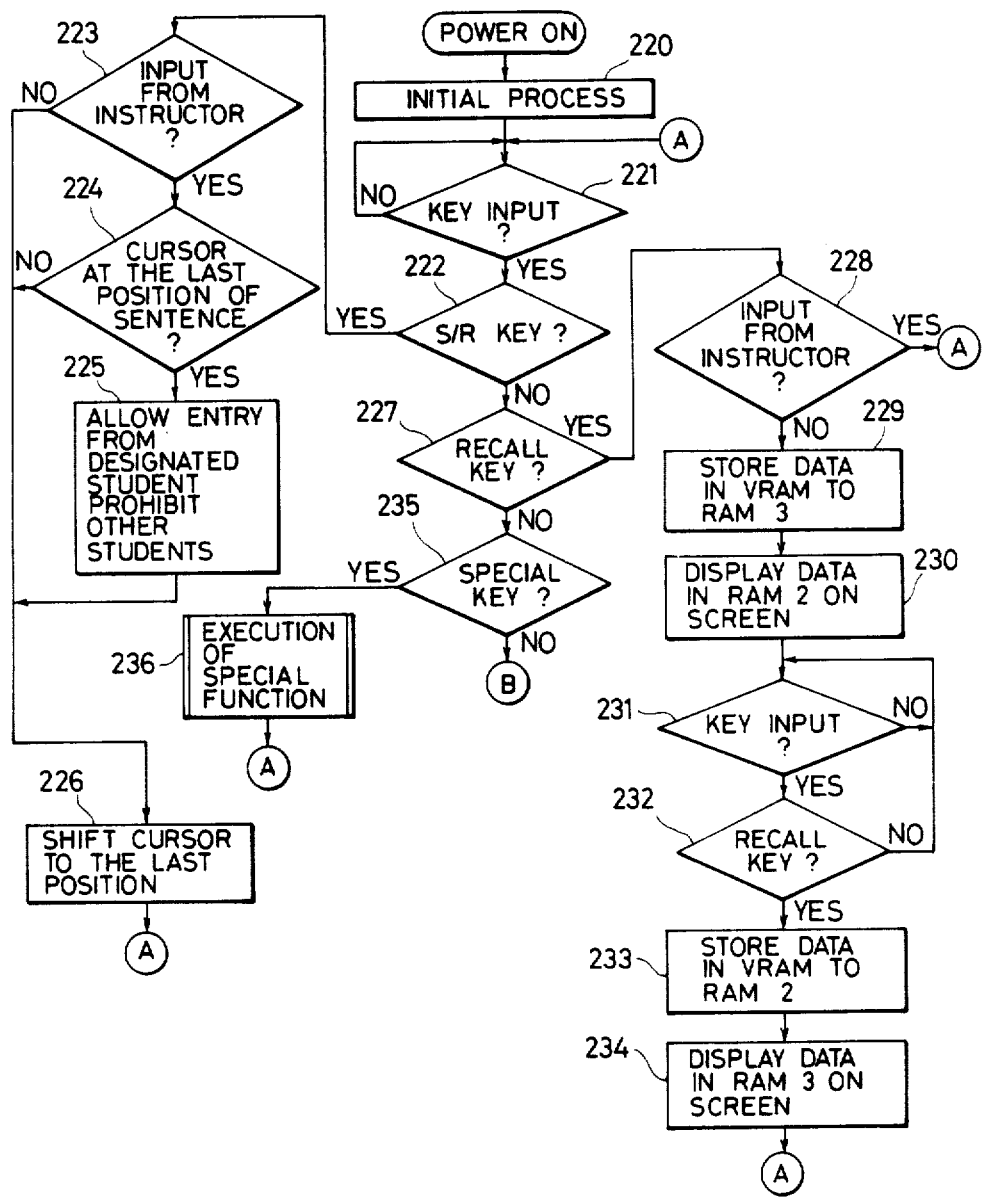
Figures 2, 9A:
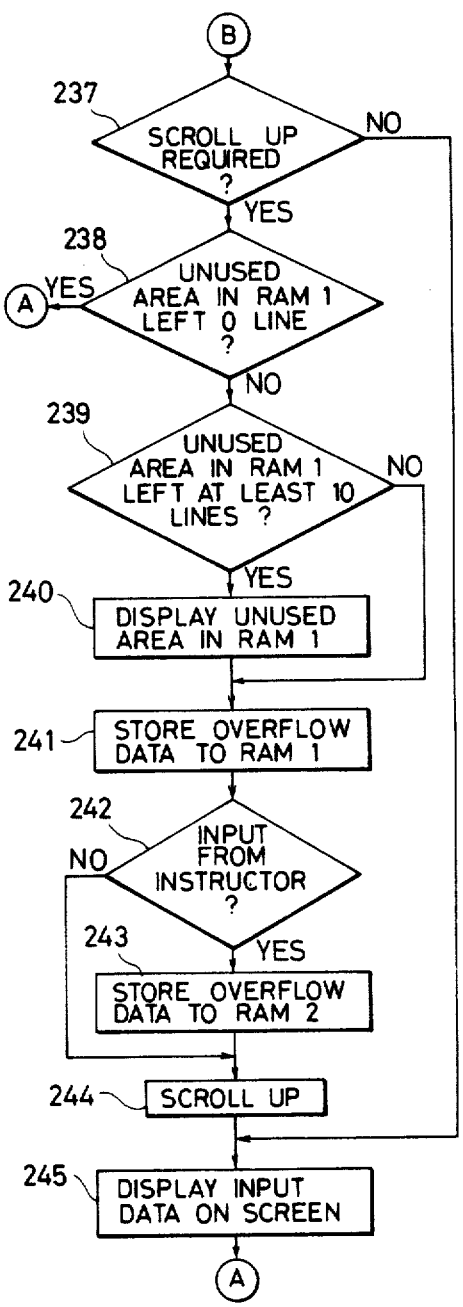

The mode of operation of this embodiment will now be described with reference to the control flow chart shown in FIG. 9A.

When power of the apparatus is turned on, initialization is performed in step 220. Thus, the apparatus is in a ready status to receive an input from the keyboards 202, 203 and 204 (step 221). When a key of one of the keyboards 202 to 204 is depressed, the corresponding keyboard generates a key data (key code data) signal and a strobe signal. The key data signal is supplied to the keyboard interface 212, while the strobe signal is supplied to the interrupt controller 210. Upon reception of the strobe signal from the keyboard, the interrupt controller 210 supplies an interrupt request to the CPU 211. Upon reception of this interrupt request from the interrupt controller 210, the CPU 211 fetches the key data signal by means of the keyboard interface 212 and performs the processing from step 222 and thereafter in accordance with the fetched key data signal.

It is first checked in step 222 if the key input is an input of the S/R key 207-1. If step 222 is YES, it is then determined in step 223 if the key input is an input from the keyboard 202 of the instructor or from the keyboard 203 or 204 of the student. If it is determined in step 223 that the key input is an input from a student, the S/R key 207-1 serves as a carriage return key. The flow then advances to step 226 wherein the cursor is shifted to a position next to the last character of the input sentence of the corresponding keyboard. The flow then returns to step 221. However, if it is determined in step 223 that the key input is an input from the keyboard 202 of the instructor, the flow advances to step 224. It is then determined in step 224 if the current cursor position is at an intermediate position of the display sentence of the instructor. If the current cursor position is at an intermediate position, the flow advances to step 226, as in the case of an input from the keyboard 203 or 204. However, if it is determined in step 224 that the current position of the cursor is next to the last character of the display sentence, the flow goes to step 225. In this case, the S/R key 207-1 serves as a select key. In step 225, the instructor depresses numeral keys on the keyboard 202 so as to designate a student. Upon this operation, the apparatus allows input from the designated student and prohibits input from other students. Thus, data can be inputted only through the keyboard of the designated student and the flow then returns to step 221. Input data from the designated student is displayed on the student display line of the CRT display 205.

If it is determined in step 222 that the key input is not an input of the S/R key 207-1, the flow goes to step 227 wherein it is checked if the key input is an input of the recall key 207-2. If step 227 is YES, the flow goes to step 228 wherein it is then checked to determine if the key input is an input from the keyboard 202 of the instructor. If YES is indicated in step 228, the flow returns to step 221. However, if NO is indicated in step 228, the flow goes to step 229 wherein the contents of the video RAM in the CRT interface 214 are transferred to the RAM3 (213-3). The flow then goes to step 230 wherein the contents of the RAM2 (213-2) are written in the video RAM of the CRT interface 214, and the contents of the RAM2 (213-2) are displayed on the screen of the CRT display 205.

The recall key 207-2 is used for the following purpose. When the instructor's question is too long to fit in the corresponding screen area and therefore cannot be fully displayed, the overflow portion of the question from the screen of the CRT display 205 is stored by means of the recall key 207-2. When the overflow portion of the question is to be recalled and displayed on the CRT display 205, the recall key 207-2 is used again.

In step 230, the overflow portion of the question of the instructor is displayed. When the student completes answering this question, the instructor depresses the recall key 207-2 to restore the original display state. In steps 231 and 232, inputs other than that from the recall key 207-2 are disabled. When the recall key 207-2 is depressed again, the data in the video RAM in the CRT interface 214 is stored in the RAM2(213-2) in step 233. In step 234, the data in the RAM3 (213-3), that is, the data which has been displayed in step 229 is stored again in the video RAM. The display state before the depression of the recall key is restored, the recall key processing is terminated, and the flow returns to step 221.

If it is determined in step 227 that the key input is not a key input from the recall key 207-2, it is checked in step 235 to determine if the key input is a key input from another special key. If YES is determined in step 235, the corresponding special function is performed in step 236. The details of the processing in step 236 are shown in FIG. 9B.

A method of deleting one character from the display on the screen using special keys will now be described.

Assume a case wherein a student has erroneously inputted "My name iss Taro" in place of "My name is Taro". In this case, when the B key 207-4 is depressed 6 times, the cursor comes to the position of erroneously inputted "s". When the delete key 207-7 is depressed, the character "s" is deleted. The remaining portion of the data is shifted to the left by one character space to display "My name is Taro". Then, since the cursor is currently at the position of "T", the A key 207-3 is depressed four times so that the cursor reaches the position after "o" i.e., the end of the input. In order to simplify this process, the S/R key 207-1 is included. After the delete key 207-7 is depressed to delete the erroneously inputted "s", the S/R key 207-7 can be depressed. Then, by means of the return function of the key 207-7, the cursor immediately returns to the position after "o". Therefore, operation of the A key 207-3 four times can be omitted.

In this manner, the S/R key 207-1 has the function of controlling the key input from the keyboards 203 and 204 and the function returning the cursor to the position after the last character of the input sentence after a correction, deletion or insertion. Discrimination between these two functions is performed automatically at the side of the keyboard 202 in accordance with the position of the cursor. When the cursor is at the last position of the sentence, the S/R key serves as a select key. If the cursor is not at the last position of the sentence after a correction, deletion or insertion, the S/R key serves as a return key.

If it is determined in step 235 that the key input is not an input from a special key, that is, that the key input is an input from a general character key, the flow advances to step 237. It is checked in step 237 if a scroll up is required. If NO in step 237, the flow goes to step 245 wherein the key input data is stored in the video RAM of the CRT interface 214. The character data in the video RAM is constantly scanned, converted into a dot pattern by the character generator, converted into a video signal, and supplied to the CRT display 205 to be displayed thereon. The position of the character data on the video RAM has a one-to-one relationship with that of the data on the CRT display 205. Therefore, when the character of the video RAM is changed, the display character on the CRT display 205 is changed. In this manner, the input data is displayed on the screen, the cursor is shifted to the right by one character space, the input position is changed to the next input data display position, and the flow returns to step 211.

When it is determined in step 237 that a scroll up is required, it is checked in step 238 if any available (i.e., unused) area in the RAM1 (213-1) is left. If no available area is left, the input character data is neglected, and the apparatus is set in the ready mode for the next key input.

Figure 6:
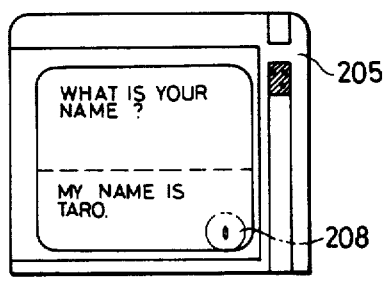

However, if there is an unused area in the RAM1 (213-1), the flow advances to step 239 wherein it is checked if the unused area in the RAM1 (213-1) comprises at least 10 lines. If the unused area in the RAM1 (213-1) comprises less than 10 lines, the remaining capacity of the CRT display 205 is displayed on the CRT display 205, in step 240. This is performed for the following reason. When the capacity of the memory is small, management of the available capacity thereof is relatively easy. However, management of the available capacity of a memory having a capacity corresponding to more than several thousand of characters is very difficult. Therefore, a demand arises for a function to measure the available capacity of the memory and to display the measured available capacity. In view of this demand, when there is only a small number of lines available in the memory, that is, when the unused area of the memory becomes less than 10 lines, "10" is displayed at the right lower corner of the CRT display 205. Every time a carriage return of a scroll up is inputted, the count is decremented by one. When the remaining number of lines becomes "0", "0" is displayed. Portion 208 of FIG. 6 shows this.

In the above embodiment, a case is described wherein the available capacity of the memory is displayed on the CRT display 205. However, if a small indicator such as in LED, a fluorescent lamp, an EL, a plasma display, or the like, is assembled at a portion of each keyboard, the available capacity of the memory can be displayed thereby to provide the same effect. In this case, the value counted by the CPU 211 is produced onto a data bus, and is supplied to a driver for driving the selected indicator for providing the display.

If it is determined in step 239 that the unused area of the RAM1 (213-1) comprises at least 10 lines, this available capacity is displayed in step 240. The flow then goes to step 241. In step 241, the overflow data of the data in the video RAM of the CRT interface 214 is transferred to the RAM1 (213-1). In step 242, it is checked if the overflow data is data input from the keyboard 202 of the instructor. If NO in step 242, the flow goes to step 244 where scrolling up is performed. However, if YES in step 242, the overflow data is stored in the RAM1 (213-1) and also in the RAM2 (213-2). The flow goes to step 244 wherein scrolling up is performed. Then, the final line can be displayed. In step 245, the input data is displayed at the first position of an area of the screen which can display data, and the cursor is moved to the next position.

In this embodiment, a conversation between one instructor and two students is described. However, data from three or more students can be inputted by using a corresponding number of keyboards.

The above description was made with reference to conversation training equipment wherein a student answers an instructor's question. However, the CRT display screen can be divided into a plurality of areas, so that the individual areas correspond to keys. Then, display data from a keyboard can be displayed at the corresponding area on the screen, as in the case of a conversation between non-handicapped persons.

The above embodiment is described with reference to conversation training equipment for handicapped children, i.e., children having impaired hearing and/or speech. However, if the character patterns in the character generators in the CRT interface are changed to those of different languages, the equipment can be used as foreign language training equipment.

If the apparatus is used for a large number of persons, a CRT display screen of a large size can be used. However, a similar effect can be obtained if each person is provided with a small CRT display.

Third Embodiment

Figure 10:
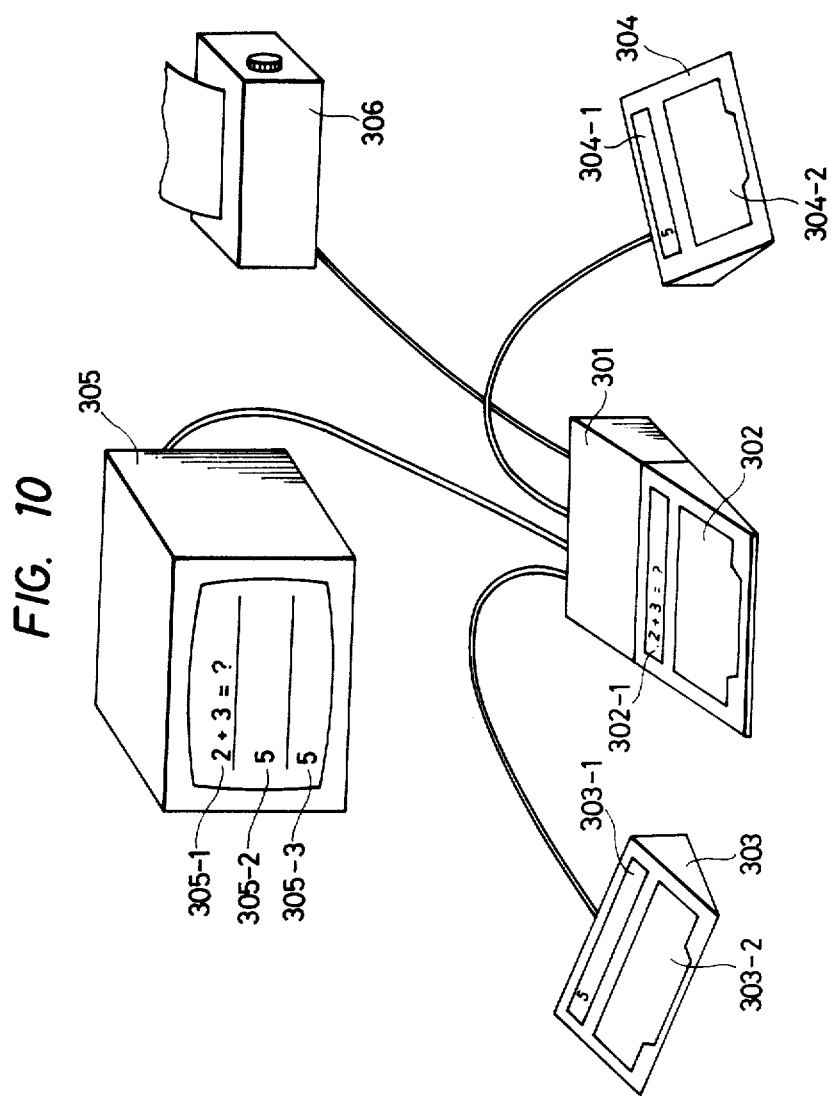

FIG. 10 is a schematic perspective view of a data processing apparatus according to a third embodiment. Data input sections 303 and 304 for students or handicapped children are connected to a main control section 301 of an instructor. Data such as a sentence inputted from a keyboard 302 of the main control section 301 is displayed at a display area 305-1 of a CRT display 305 and at a display 302-1 comprising a liquid crystal display at the main control section 301. Sentences inputted from keyboards 303-2 and 304-2 at the data input sections 303 and 304 are displayed at display areas 305-2 and 305-3 of the CRT display and at displays 303-1 and 304-1 comprising liquid crystal displays. In this manner, the sentences inputted through the keyboards 302, 303-2 and 304-2 are displayed at the areas 305-1 to 305-3 of the CRT display 305 and on the liquid crystal displays 302-1, 303-1 and 304-1 so as to allow a conversation. Therefore, hearing or speech handicapped persons can converse or can be trained to converse with this apparatus. The apparatus can also be used for teaching a language or a subject such as mathematics.

In general, the instructor 302 uses the keyboard 302 of the control section 301, and students use the keyboards 303-2 and 304-2.

Figure 11:
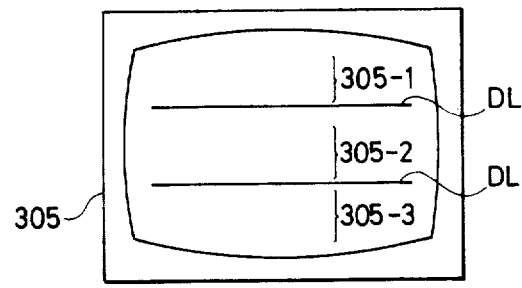

The method of conversation or training between the instructor and students will be described below. The instructor inputs, for example, "2 plus 3 equals what?" from his keyboard 302. Then, this sentence is displayed at the display area 305-1 of the CRT display 305. FIG. 11 shows the configuration of the screen. The same sentence is also displayed at the display 302-1 of the control section 301. The two students input the answer "Correct answer is 5" at the keyboards 303-2 and 304-2 of the data input section 303 and 304. Then, these answers are displayed at the display areas 305-2 and 305-3 of the CRT display 305 and at the displays 303-1 and 304-1. Since the apparatus allows simultaneous input through the three keyboards, the display state as in an actual conversation can be realized, so that effective training for conversation can be provided.

Figure 12:
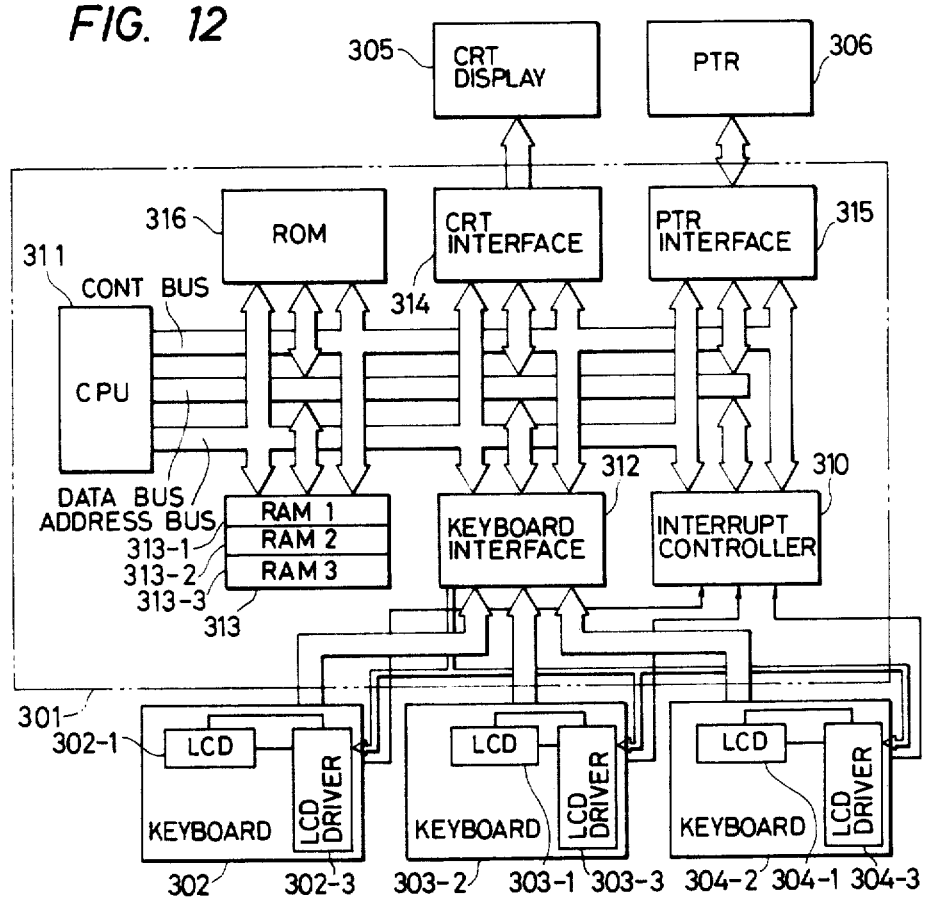

FIG. 12 is a schematic block diagram of a data processing apparatus of this embodiment. Although four or more keyboards can be connected to the control section 301, only three keyboards are connected in this case.

An interrupt controller 310 controls a data signal from a plurality of keyboards. A CPU 311 controls the overall apparatus. A key interface 312 is provided for fetching the data signal from the keyboard and for transferring the data from the CPU 311 to LCD drivers 302-3, 303-3 and 304-3. A RAM 313 stores an overflow portion of a sentence which falls outside the display area of the CRT display 305. A CRT interface 314 converts the input data signal into a dot pattern stored in the character generator and then converts it into a video signal which can be supplied to the CRT display 305. A printer interface 315 is used for printing out a sentence stored in the RAM 313; it converts the sentence stored in the RAM 313 into a signal which can be supplied to a printer 306. A ROM 316 stores a control program for the control section. The LCD drivers 302-3, 303-3 and 304-3 are included so that LCDs can receive the data signal.

When a key is depressed, the corresponding keyboard produces a data signal and a strobe signal. The data signal is supplied to the key interface 312, while the strobe signal is supplied to the interrupt controller 310. The interrupt controller 310 discriminates if an interrupt can be made. If an interrupt can be performed, the interrupt controller 310 supplies the data designating the interrupt address to the CPU 311. In response to this data, the CPU 311 fetches the data signal from the key interface 312. The fetched data is transferred to the video RAM in the CRT interface 314 and the LCD drivers. The data in the video RAM is constantly scanned, converted into a dot pattern by the character generator, converted into a video signal, and displayed by the CRT display 305. The character data on the video RAM corresponds to the display on the CRT display 305. Therefore, when the character data of the video RAM is changed, the character displayed on the CRT display 305 is also changed. The data is also displayed on the LCDs. When one of the areas in the video RAM is full, the data of one line of this area is transferred to the corresponding RAM1 (313-1), RAM2 (313-2) or RAM3 (313-3). When the print key of the corresponding keyboard is depressed, the data from the RAM1, RAM2 or RAM3 is transferred to the printer interface 315 through the CPU 311 and is supplied to the printer 306 to be printed thereby.

Figure 13:
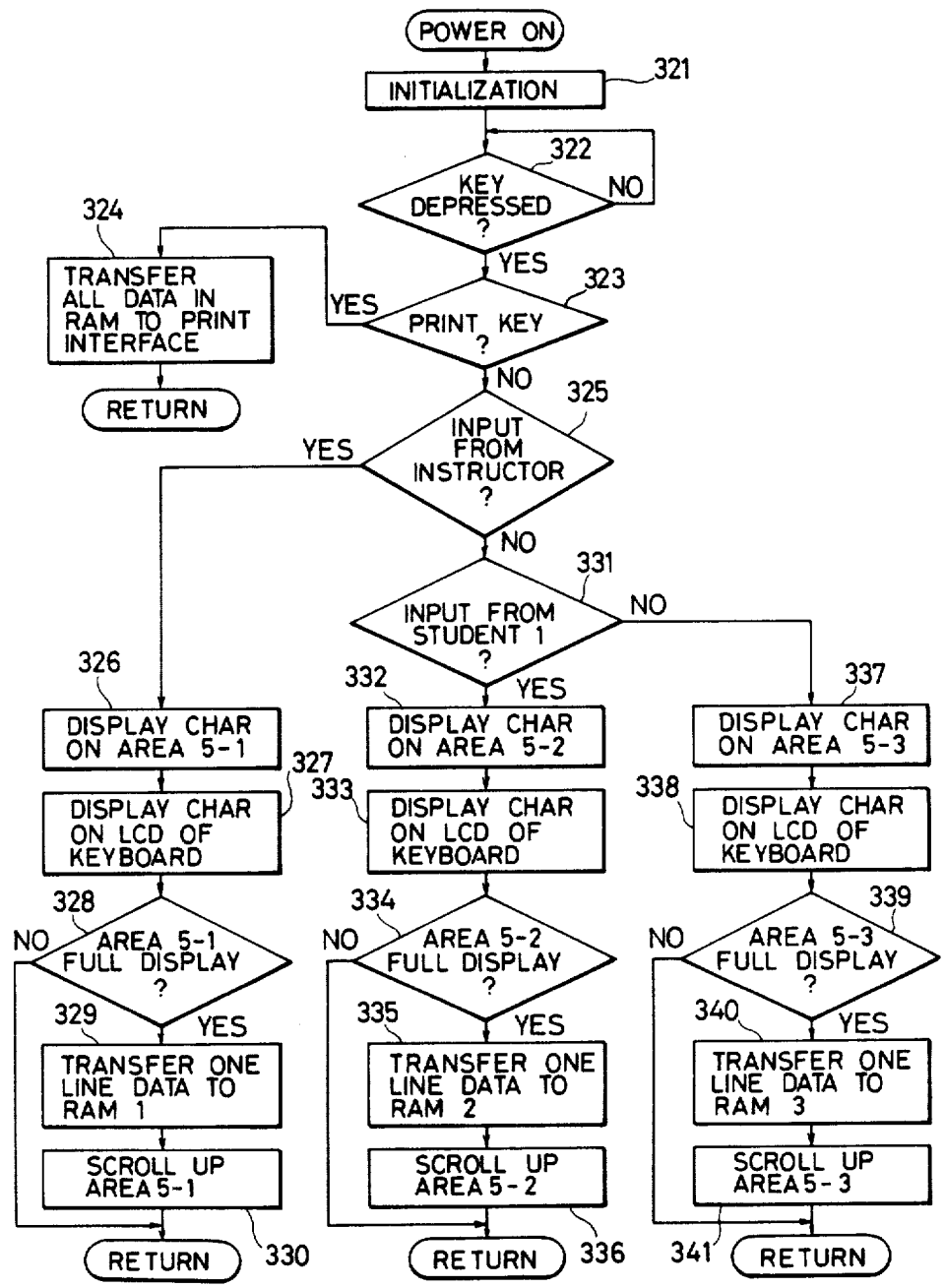

FIG. 13 is a schematic flow chart showing the operation of this embodiment.

When power to the apparatus is turned on, in step 321, initialization such as display of partitioning lines DL on the CRT display 305 is performed. In step 322, it is checked if any key has been depressed. If YES in step 322, it is checked in step 323 if the depressed key is a print key. If YES in step 323, the data stored in the video RAM is transferred to the printer interface 315 to perform printing, in step 324. If NO in step 323, it is checked in steps 325 and 331 which key is depressed (instructor's or student's). If it is determined in step 325 that the depressed key is a key on the instructor's keyboard, the input data is displayed in the area 305-1 in step 326, and is also displayed at the display 302-1 in step 327. It is then checked in step 328 if the area 305-1 is full of data. If NO in step 328, the flow returns to step 322 and the next key input is awaited. If YES in step 328, the uppermost line data in the area 305-1 is transferred to the RAM1 in step 329 and scrolling up is performed in step 330. After step 330, the flow returns to step 322. When it is determined in step 331 that the depressed key is a key of student 1, the same processing as in the case of the instructor is performed in steps 331 to 336. When it is determined in step 331 that the depressed key is a key of student 2, the same processing is performed in steps 337 to 341. The input data is displayed at the corresponding areas and displays. If necessary, scrolling up is performed, and the data of one line of the corresponding area is transferred to the corresponding RAM.

The above description was made with reference to a case wherein the input sentence was displayed on the keyboard. However, it is also possible to display the input sentence at only a portion of the display section and also to display the available capacity of the memory for storing the input sentences.

The above embodiment was described with reference to equipment for conversation training of hearing and-/or speech impaired children. However, if dot patterns of characters of different languages are stored as the dot patterns in the character generator in the CRT interface, the apparatus can be used as equipment for teaching foreign languages. The apparatus can similarly be used for teaching any subject such as mathematics.

Fourth Embodiment

The fourth embodiment of the present invention will now be described with reference to a data processing apparatus which stores in a memory sentences inputted through a plurality of keyboards, reads out the input sentences as needed, and prints the read sentences in correspondence with the respective keyboards (different persons) based on partitioning lines.

Figure 14:
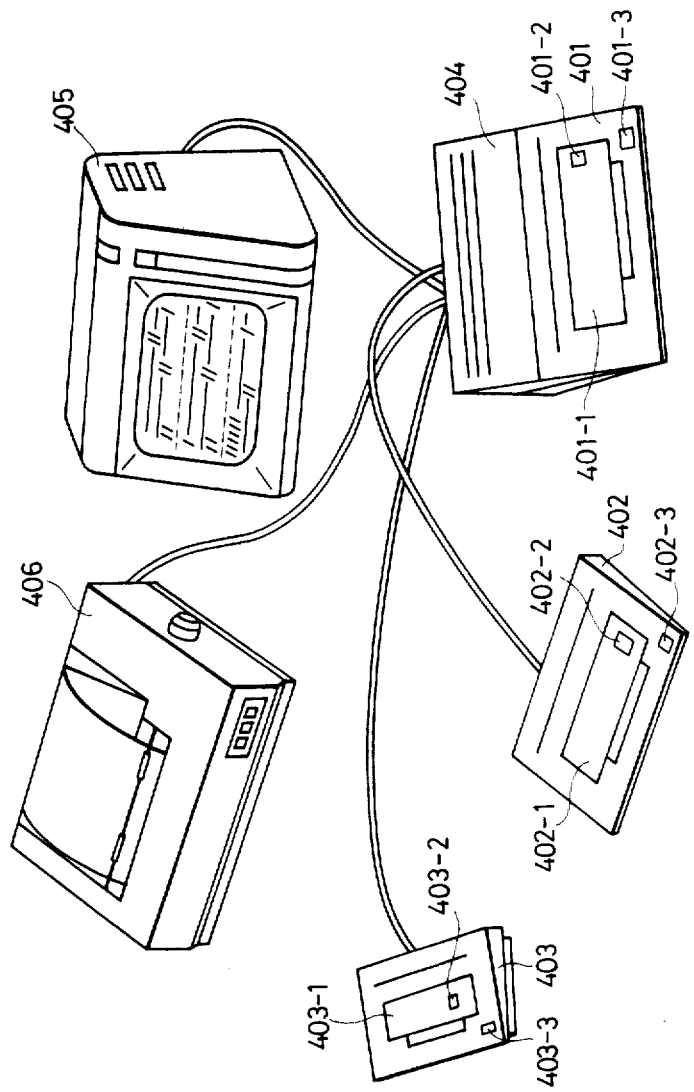
FIG. 14 is a view showing the configuration of a data processing apparatus of this embodiment.

FIG. 14 is a perspective view showing the outer appearance of the data processing apparatus as conversation training equipment according to the fourth embodiment of the present invention. Keyboards 401, 402 and 403 for inputting sentences have key groups 401-1, 402-1 and 403-1 consisting of a plurality of character keys, numeral keys and the like. The arrangement of the keys is the same as that of general typewriters. The key groups 401-1, 402-1 and 403-1 include punctuation mark input keys 401-2, 402-2 and 403-2. The keyboards 401, 402 and 403 further include print keys 401-3, 402-3 and 403-3 for instructing printing of the sentences inputted through the corresponding keyboards. A control section 404 performs processing on the sentences inputted through the keyboards 401, 402 and 403. A CRT display 405 displays the sentences inputted from the keyboards 401, 402 and 403. A printer 406 records the sentences on a recording paper sheet.

Figure 15:
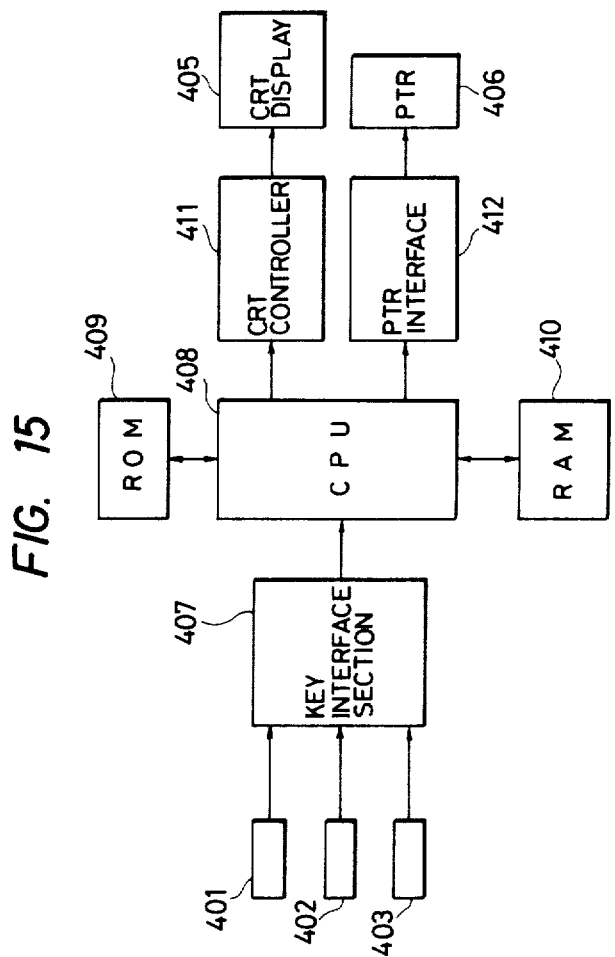

FIG. 15 is a block diagram showing the configuration of the apparatus shown in FIG. 14. A key interface 407 is connected to the keyboards 401, 402 and 403. A central processing unit (CPU) 408 processes sentences inputted through the key interface 407. A read-only memory 409 stores a program for operating the CPU. A random-access memory (RAM) 410 stores sentences inputted through the keyboard 401, 402, or 403. A CRT controller 411 is connected to the CRT display 405, and a printer interface 412 is connected to the printer 406. In the apparatus having the configuration as described above, the sentence inputted through each keyboard is supplied to the CPU 408 through the key interface 407 and is then supplied to the CRT controller 411 to be displayed on the CRT display 405. The input sentence is also stored in the RAM 410. If printing of the sentence is required, the sentence stored in the RAM 410 is supplied to the printer 406 through the printer interface 412 and is printed out on a recording paper sheet.

Figure 16:
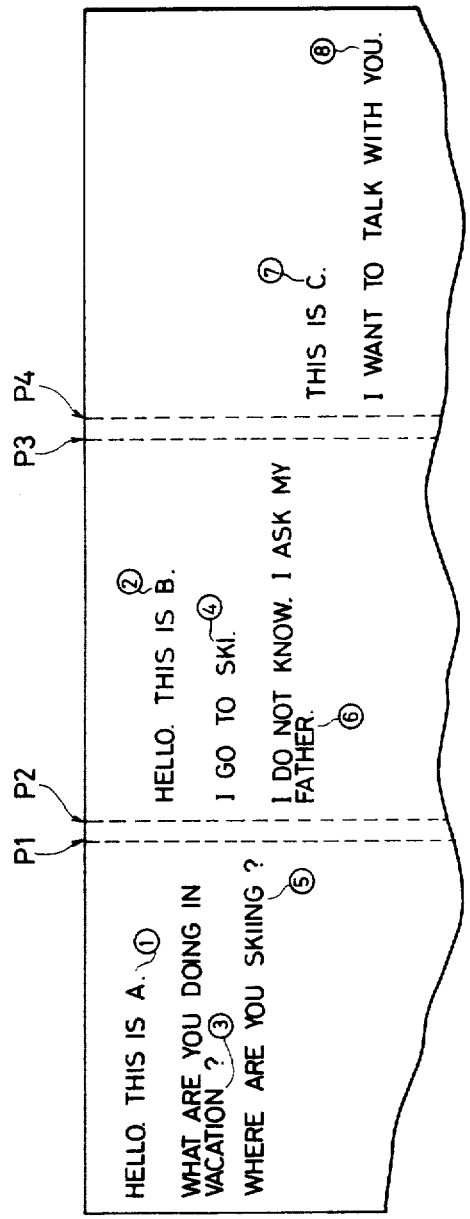

FIG. 16 shows an example of a printed out sheet when a conversation is performed using three keyboards 401, 402 and 403 shown in FIG. 14. According to this embodiment, after each conversation, the instructor depresses the punctuation mark input key 401-2 so that the sentences inputted by the instructor and students are printed in accordance with the input order.

Figure 17:
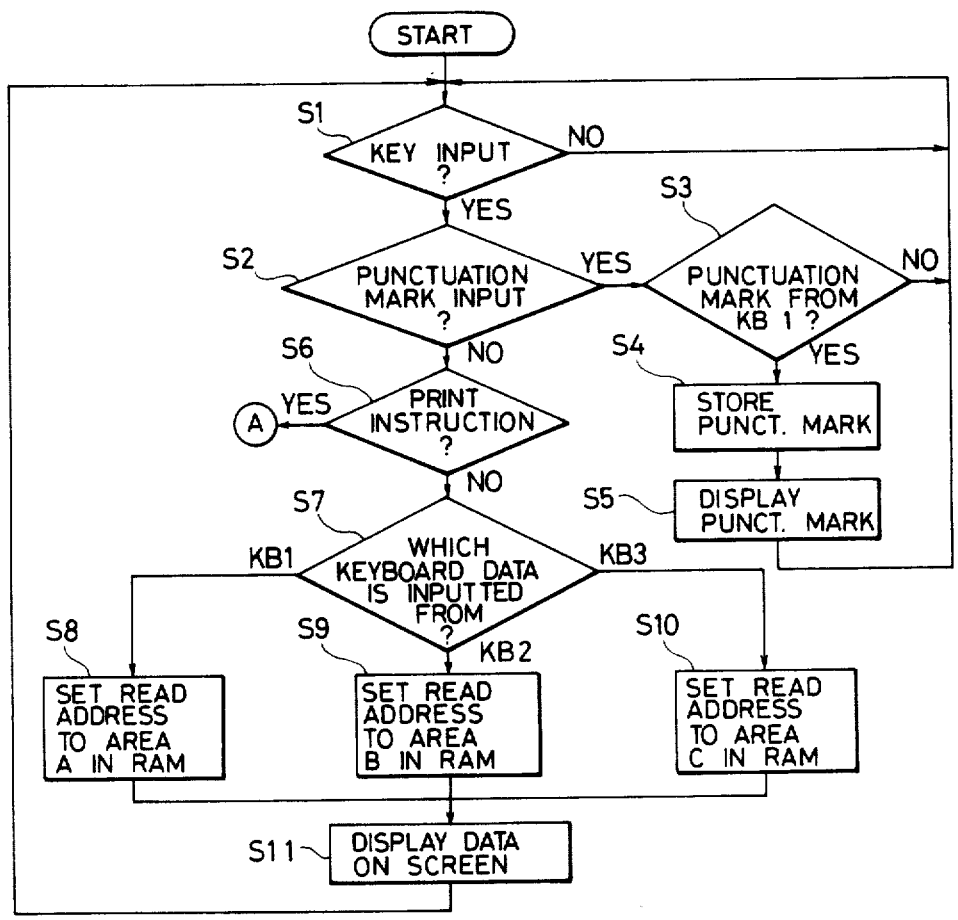
Figure 18A:
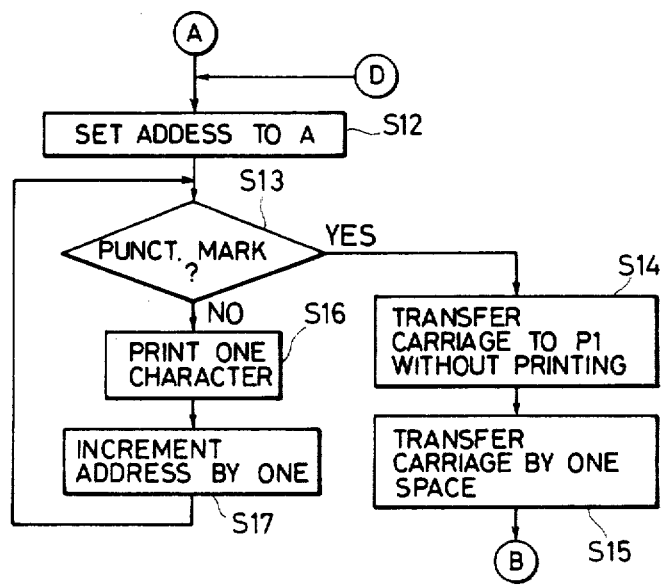
Figure 18B:
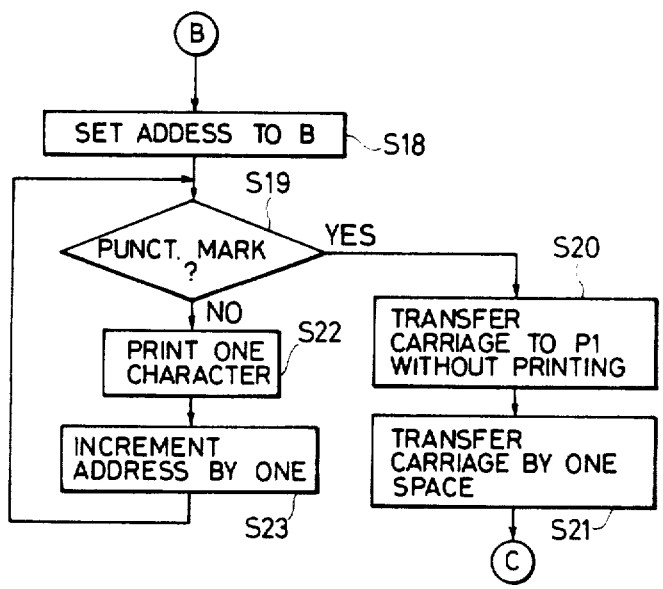
Figure 18C:
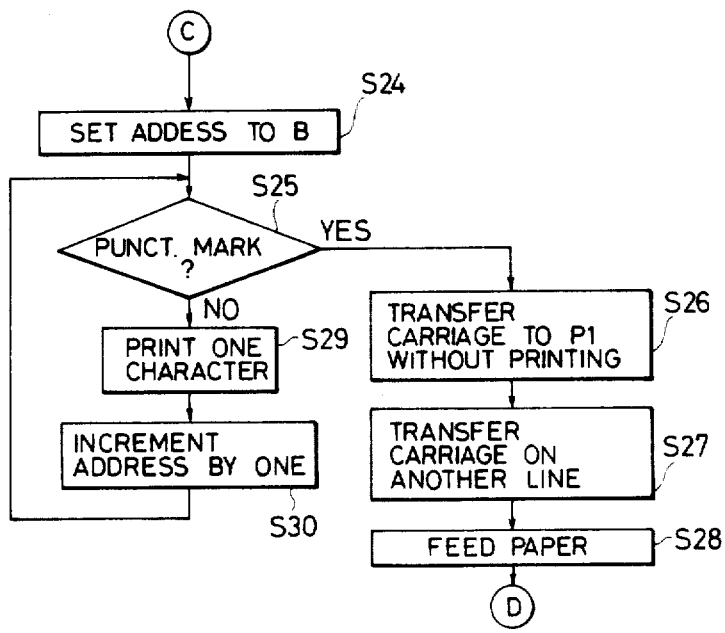
Figure 19:
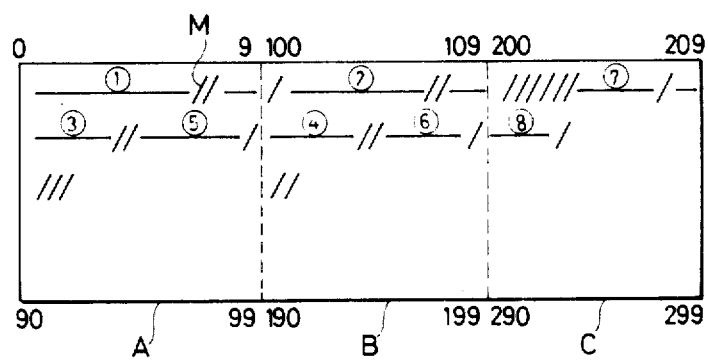

The control flow of the apparatus shown in FIG. 15 for printing out the sentences as shown in FIG. 16 will be described with reference to the flow chart shown in FIGS. 17 and 18. In this embodiment, the instructor uses the keyboard 401, and the students use the keyboards 402 and 403. When the instructor inputs sentence ① from this keyboard 401, the sentence ① is supplied to the CPU 408 through the key interface 407. The CPU 408 discriminates if the input data is a punctuation mark or a printing instruction (steps S1, S2, S6). In this case, since the input data is character data, the CPU 408 then discriminates the keyboard which is used for inputting this sentence (step S7). In this case, the data is inputted through the keyboard 401, and the data is therefore stored in area A in the RAM 410. Note that the RAM 410 consists of the area A from address 0 to 99, area B from address 100 to 199, and area C from address 200 to 299, as shown in FIG. 19. The area A is for storing the sentence inputted from the keyboard 401, the area B is for storing the sentence inputted from the keyboard 402, and the area C is for storing the sentence inputted from the keyboard 403. The input data is then supplied to the CRT controller 411 and is displayed on the CRT display 405 (step S11). When the punctuation mark input key 401-2 of the keyboard 401 is depressed next, the CPU 408 discriminates if the punctuation mark data is that from the keyboard 401 (step S3). In this case, the punctuation mark data is that from the keyboard 401, the input data is stored in the area A of the RAM 410 at the address next to that storing the sentence ①. At the same time, the data of a punctuation mark M is stored at the head address of the area B of the RAM 410 as well as at the head address of the area C thereof (step S4). The punctuation marks are also displayed on the CRT display 405 (step S5). When the student using the keyboard 402 inputs sentence ② shown in FIG. 16 as a response to the sentence ①, the CPU 408 performs the similar operation (steps S1, S2, S6, S7). The sentence ② is stored at sequential addresses next to the previous punctuation mark M of the area B of the RAM 410 (step S9). The sentence ② stored in the area B of the RAM 410 is displayed on the CRT display 405 (step S11). When the punctuation mark input key 401-2 of the keyboard 401 is depressed next by the instructor, the same control operation is performed (steps S1, S2, S3). Thus, the mark M is stored at the address next to that storing the sentence stored ② in the area B of the RAM 410. The same mark M is also stored at the address next to the previous mark M in the area A of the RAM 410 as well as the address next to the previous mark M in the area C thereof (step S4). These punctuation marks are displayed on the CRT display 405 (step S5). When sentences ③, ④, ⑤, ⑥, ⑦, and ⑧ are inputted from the keyboards 401, 402 and 403 and the punctuation marks are inputted from the keyboard 401 at the ends of the respective sentences, the same control operation as described above is performed so as to store the sentences and the punctuation marks in the areas of the RAM 410, as shown in FIG. 19. The operation for printing out the sentences inputted through the keyboards 401, 402 and 403 will now be described. When the instructor depresses the print key 401-3 of his keyboard 401, the printing instruction data is supplied to the CPU 408. When the CPU 408 discriminates that the input data is the printing instruction data (steps S1, S2, S3), it sequentially reads out the sentences read out from the RAM 410 and supplies them to the printer 406 through the printer interface 412. The sentences are thus printed. Subsequently, the CPU 408 sets the read address at the head address of the area A and discriminates if the data stored at this address is punctuation mark data (steps S12, S13). In this case, since the data stored at the head address of the area A of the RAM 410 is character data, the character data is supplied to the printer 406 through the printer interface 412 and is printed (step S16). The read address is incremented by one, and the data is read out from the next address in the area A of the RAM 410 (step S17). The data read out from the area storing the sentence ① in the area A of the RAM 410 thereafter is the character data. Therefore, the above operation is repeated, and printing is performed. The CPU 408 then sets the address next to that storing the sentence ① as the read address, and reads out the data stored at this address. The CPU 408 discriminates if the readout data is the punctuation mark data (step S13). Since the data is discriminated to the punctuation mark data in this case, the carriage mounting the printing head thereon (not shown) is fed to position P1 without printing, as shown in FIG. 16 (step S14). The carriage is then shifted to position P2 by one character space (step S15). The CPU 408 then sets the read address at the head address of the area B of the RAM 410 (step S18), and reads out the data stored at this address. The CPU 408 then discriminates if the readout data is the punctuation mark data (step S19). In this case, the data stored at the head address of the area B of the RAM 410 is discriminated to be the punctuation mark data. Then, as shown in FIG. 16, the carriage is shifted to position P3 without printing and then to position P4 by one character space (Steps S20, S21). The CPU 408 finally sets the head address of the area C of the RAM 410 as the read address (step S24), and reads out the data stored at this address. The CPU 408 discriminates if the readout data is the punctuation mark data (step S25). In this case, the data stored at the head address of the area C of the RAM 410 is discriminated to be the punctuation mark data. Then, the carriage is shifted without printing and is then returned to the print start position of the next line (steps S26, S27), as shown in FIG. 16. The paper is then fed for one line (step S28). For printing of the next line, the CPU 408 sets as the read address the address next to that storing the initial punctuation mark in the area A of the RAM 410 (step S12), and reads out data from this address. Since the data stored at this address is the punctuation mark data in this case, the carriage is shifted to the position P1 without printing and then to the position P2 by one character space (steps S13, S14, S15). The CPU 408 then sets as the read address the address next to that storing the initial punctuation mark in the area B of the RAM 410 (step S18), and reads out the data stored at this address. Since the readout data is the character data in this case, the data is supplied to the printer 406 and is printed thereby (steps S19 to S22). The read address is incremented by one, and the next data is read out from the area B of the RAM 410 (step S23). The data sequentially read out from the memory area storing the sentence ② in the area B of the RAM 410 thereafter is the character data. Therefore, the same control operation as described above is repeated, and the data is printed. The CPU 408 sets as the read address the address next to that storing the sentence ②, and reads out the data from this address. The CPU 408 discriminates if the readout data is the punctuation mark data (step S19). Since the readout data is discriminated to be the punctuation mark data in this case, the carriage is shifted to the position P3 without printing, and then to the position P4 by one character space (steps S20, S21), as shown in FIG. 16. Then, the CPU 408 sets as the read address the address next to that storing the initial punctuation mark data in the area C of the RAM 410 (step S24), and reads out the data from this address. In this case, the readout data is the punctuation mark data. Therefore, the carriage is shifted without printing and is returned to the print start position of the next line (steps S25, S26, S27, S28). Thereafter, readout and printing of the data stored in the respective areas A, B and C of the RAM 410 is performed in the same manner, and printing as shown in FIG. 16 is completed.

As has been described above, according to the present invention, printing is performed for each of data inputted from a corresponding keyboard. In addition, the respective data is printed in accordance with the time sequence it is inputted. Therefore, the instructor can easily find his question and answers by students (who answered how and who answered first).

What is claimed is:

1. A data processing apparatus comprising:
a plurality of input means;
display means having predetermined areas respectively assigned to said plurality of input means for displaying data inputted from said plurality of input means, wherein said display means has a cursor assigned to each of the predetermined areas for said plurality of input means and said display means has partitioning lines for partitioning the predetermined areas of said display means; and
control means for controlling the display of the data inputted through each of said plurality of input means so that it appears at the corresponding predetermined areas of said display means.

2. An apparatus according to claim 1, further comprising memory means for storing the data inputted from said plurality of input means in correspondence therewith.

3. An apparatus according to claim 1, wherein each of said plurality of input means has designating means for designating display of the input data at a display area different from the predetermined area assigned thereto.

4. An apparatus according to claim 1, wherein the number of the partitioning lines is N-1 and N is the number of said cursors.

5. A data processing apparatus comprising:
a plurality of input means;
display means for displaying data inputted from said plurality of input means;
designating means, arranged at at least one of said plurality of input means, for designating output of the data inputted from another of said plurality of input means to said display means; and
control means for controlling the output of the data inputted from said another of said plurality of input means to said display means in accordance with an instruction from said designating means.

6. A data processing apparatus comprising:
input means for inputting data;
memory means for storing the data inputted by said input means;
display means for displaying the data inputted by said input means; and
output means for detecting an available capacity of said memory means and for outputting to said display means the available capacity of said memory means which changes with the input of the data by said input means after the available capacity reaches a predetermined value.

7. A data processing apparatus comprising:
a plurality of input means;
first display means connected to said input means for displaying at an area assigned to each of said plurality of input means the data input from said each of said plurality of input means; and
second display means connected to said first display means for printing out the data which has been input from said each of said plurality of input means displayed by said display means.

8. A data processing apparatus comprising:
a plurality of input means;
display means, consisting of a plurality of display areas respectively correspnding to said plurality of input means, for displaying data inputted through each of said plurality of input means at the corresponding display area thereof wherein said display means has partitioning lines for partitioning the predetermined areas of said display means respectively assigned to said plurality of input means;
a cursor assigned to each of the display areas of said display means and for designating a display position of the data inputted from each of said plurality of input means; and
control means for shifting the cursors assigned to said display areas of said display means every time the data is inputted from said plurality of input means, respectively.

9. A data processing apparatus comprising:
a plurality of input means;
display means for displaying data inputted from said plurality of said input means;
a cursor for displaying a display position at said display means for the data inputted from each of said plurality of input means;
a key, arranged at at least one of said plurality of input means, having a first mode for allowing input from a desired one of said plurality of input means and a second mode for shifting said cursor to a predetermined position; and
means for detecting the position of said cursor on said display means and for setting said key in the first or second mode.

10. A data processing apparatus comprising:
a plurality of input means for inputting character data and punctuation data for indicating punctuations of the character data;
memory means having a plurality of memory areas for storing the data inputted from said plurality of input means at the different memory areas thereof; and recording means for recording the data stored in each of said memory areas in correspondence therewith, said recording means sequentially accessing said plurality of memory areas for reading out the data therefrom and printing out the data if the readout data is the character data and for processing the data as one-line space data if the readout data is the punctuation data.

11. An apparatus according to claim 10, wherein each of said input means comprises a plurality of character keys for inputting the character data, and a punctuation key for inputting the punctuation data indicating the punctuations of the character data.

* * * * *